US012072050B2

(12) United States Patent
Simon

(10) Patent No.: US 12,072,050 B2
(45) Date of Patent: Aug. 27, 2024

(54) PUSH-FIT PIPE FITTING

(71) Applicant: IPEX TECHNOLOGIES INC., Oakville (CA)

(72) Inventor: Jis Simon, Brampton (CA)

( * ) Notice: Subject to any disclaimer, the term of this patent is extended or adjusted under 35 U.S.C. 154(b) by 548 days.

(21) Appl. No.: 17/363,750

(22) Filed: Jun. 30, 2021

(65) Prior Publication Data

US 2021/0324986 A1    Oct. 21, 2021

Related U.S. Application Data

(63) Continuation-in-part of application No. PCT/CA2020/000118, filed on Sep. 30, 2020.

(30) Foreign Application Priority Data

Oct. 8, 2019   (CA) ..................................... 3057911

(51) Int. Cl.
*F16L 37/091*    (2006.01)
(52) U.S. Cl.
CPC ................................ *F16L 37/0915* (2016.05)
(58) Field of Classification Search
CPC ... F16L 37/091; F16L 37/0915; F16L 37/098; F16L 37/0982; F16L 37/123;
(Continued)

(56) References Cited

U.S. PATENT DOCUMENTS

| 4,073,514 A | 2/1978 | Pate |
| 4,848,805 A | 7/1989 | Bucher |

(Continued)

FOREIGN PATENT DOCUMENTS

| AU | 2005232296 | 5/2006 |
| AU | 2018201442 A1 | 9/2018 |

(Continued)

OTHER PUBLICATIONS

Translation DE 10 2015 000 990 A1 (Year: 2013).*
(Continued)

*Primary Examiner* — Aaron M Dunwoody

(57) ABSTRACT

In a preferred embodiment, there is provided a pipe coupling comprising a coupling body having two or more open ends and a pipe engagement assembly for attachment to the open end for engagement of a pipe thereto, the pipe engagement assembly comprising a retainer ring and a grip ring, and the coupling body comprising a sidewall defining an internal bore sized for receiving at least a portion of the pipe and the retainer ring, the retainer ring being dimensioned to be received at least partially by the grip ring and to receive the pipe therethrough, wherein the grip ring comprises a plurality of first projections extending inwardly towards the bore to engage the pipe, and the retainer ring comprises one or more second projections extending outwardly to releasably engage the sidewall, the retainer ring defining a plurality of slots sized to receive the first projections therethrough, wherein the slots are positioned to retain the first projections with the grip ring engaging the pipe and the second projections engaging the sidewall, thereby retaining the grip ring and the pipe to the open end.

33 Claims, 14 Drawing Sheets

(58) Field of Classification Search
CPC ....... F16L 37/127; F16L 37/133; F16L 21/08; F16L 21/022; F16L 21/03
See application file for complete search history.

(56) References Cited

U.S. PATENT DOCUMENTS

| | | | |
|---|---|---|---|
| 4,903,996 | A | 2/1990 | Herr |
| 4,934,743 | A | 6/1990 | Kapgan et al. |
| 5,224,741 | A | 7/1993 | Burkit et al. |
| 5,709,418 | A | 1/1998 | Benson et al. |
| 6,293,595 | B1 | 9/2001 | Marc et al. |
| 7,048,309 | B2 | 5/2006 | Gill |
| 7,108,289 | B1 | 9/2006 | Holmes, IV et al. |
| 7,125,054 | B2 | 10/2006 | Jones |
| 7,140,645 | B2 | 11/2006 | Cronley |
| 7,195,287 | B2 | 3/2007 | Wai |
| 7,410,174 | B2 | 8/2008 | Jones et al. |
| 8,322,755 | B2 | 12/2012 | Kluss et al. |
| 8,608,205 | B2 | 12/2013 | Lai |
| 8,858,144 | B2 | 10/2014 | Van Cor |
| 8,925,977 | B2 | 1/2015 | Holmes, IV et al. |
| 9,068,680 | B1 | 6/2015 | Crompton et al. |
| 9,453,602 | B2 | 9/2016 | Li |
| 9,506,591 | B2 | 11/2016 | German, Jr. et al. |
| 9,611,958 | B1 | 4/2017 | Carter, Jr. et al. |
| 9,739,401 | B1 | 8/2017 | Kennedy, Jr. |
| 9,784,393 | B2 | 10/2017 | Taylor |
| 9,829,137 | B2 | 11/2017 | Kennedy, Jr. |
| 10,047,884 | B2 | 8/2018 | Taylor |
| 10,094,500 | B2 | 10/2018 | Crompton et al. |
| 2008/0107227 | A1 | 5/2008 | Koepke |
| 2010/0225111 | A1 | 9/2010 | Owen |
| 2011/0291409 | A1 | 12/2011 | Kennedy, Jr. et al. |
| 2012/0001426 | A1 | 1/2012 | Yamashita et al. |
| 2012/0056419 | A1 | 3/2012 | Davidson |
| 2012/0068456 | A1 | 3/2012 | Smith |
| 2012/0274063 | A1 | 11/2012 | Kennedy, Jr. |
| 2013/0187380 | A1 | 7/2013 | Leggett |
| 2015/0159792 | A1 | 6/2015 | Bobo et al. |
| 2016/0053923 | A1 | 2/2016 | Leggett |
| 2018/0001571 | A1 | 1/2018 | Lennon et al. |
| 2018/0080589 | A1 | 3/2018 | Heon et al. |

FOREIGN PATENT DOCUMENTS

| | | |
|---|---|---|
| CA | 2 340 890 | 9/2002 |
| CA | 2 565 898 | 6/2004 |
| CA | 2 730 348 | 1/2010 |
| CA | 2 932 714 | 6/2015 |
| CA | 2 893 393 | 8/2015 |
| CA | 2 893 394 | 11/2015 |
| DE | 10 2015 000 990 A1 | 7/2016 |
| EP | 164 171 | 12/1985 |
| EP | 399 574 | 11/1990 |
| EP | 533 749 | 3/1993 |
| EP | 728 977 | 8/1996 |
| EP | 896 180 | 2/1999 |
| EP | 1 141 607 | 10/2001 |
| EP | 1 178 255 A2 | 2/2002 |
| EP | 1 292 791 | 3/2003 |
| EP | 1 481 187 | 12/2004 |
| EP | 1 517 075 B1 | 3/2005 |
| EP | 1 581 764 | 10/2005 |
| EP | 2 020 553 | 2/2009 |
| EP | 2 320 118 B1 | 5/2011 |
| EP | 2 470 817 | 7/2012 |
| EP | 2 472 160 B1 | 7/2012 |
| EP | 2 564 103 | 3/2013 |
| EP | 2 577 143 | 4/2013 |
| EP | 2 593 703 | 5/2013 |
| EP | 2 850 354 | 3/2015 |
| EP | 2 899 362 | 7/2015 |
| GB | 2 237 087 | 4/1991 |
| GB | 2 336 638 | 10/1999 |
| GB | 2 401 158 | 11/2004 |
| GB | 2 451 628 | 2/2009 |
| GB | 2 469 933 | 11/2010 |
| WO | WO 1996/007048 | 3/1996 |
| WO | WO 1996/027752 | 9/1996 |
| WO | WO 97/03314 | 1/1997 |
| WO | WO 1997/03314 | 1/1997 |
| WO | WO 99/51906 | 10/1999 |
| WO | WO 2005/047745 A2 | 5/2005 |
| WO | WO 2008/104562 A1 | 9/2008 |
| WO | WO 2009/108963 | 9/2009 |
| WO | WO 2010/003314 | 1/2010 |
| WO | WO 2012/027464 A2 | 3/2012 |
| WO | WO 2012/064725 | 5/2012 |
| WO | WO 2015/184108 | 12/2015 |
| WO | WO 2015/184108 A1 | 12/2015 |
| WO | WO 2016/199408 A1 | 12/2016 |
| WO | WO 2017/178798 | 10/2017 |
| WO | WO 2018/023196 | 2/2018 |

OTHER PUBLICATIONS

Photos of Bow Plumbing Group Inc.'s product advertisement for "push-to fit fittings" available as early as Sep. 23, 2019.

Extended European Search Report and Written Opinion for European Application No. 20874732.9 dated Sep. 27, 2023.

International Search Report prepared in respect of International Application No. PCT/CA2020/000118, date of mailing Feb. 18, 2021.

Written Opinion prepared in respect of International Application No. PCT/CA2020/000118, date of mailing Feb. 18, 2021.

International Preliminary Report on Patentability (IPRP) in respect of International Application No. PCT/CA2020/000118, date of issuance Apr. 12, 2022.

* cited by examiner

PUSH-FIT PIPE FITTING

RELATED APPLICATION

This continuation-in-part application claims the benefit of the filing date of PCT International Application No. PCT/CA2020/000118 filed on 30 Sep. 2020, which claims foreign priority to Canadian Utility Patent Application No. 3,057,911 filed on 8 Oct. 2019.

SCOPE OF THE INVENTION

The present invention relates to a pipe fitting for fluidically coupling two or more pipes, and which most preferably includes a push fit or snap fit engagement mechanism to establish the fluidic connection to the pipes.

BACKGROUND OF THE INVENTION

A pipe fitting or adapter may be used in a piping or plumbing system, such as a drain-waste-vent (DWV) system, in order to manipulate or regulate fluid flow in the system in the conveyance of, for example, water, gas and/or liquid waste in a domestic or commercial setting. For instance, a DWV system utilize in a domestic setting may typically include a number of straight sections of plastic pipes formed mainly with polyvinyl chloride (PVC), chlorinated polyvinyl chloride (CPVC) and/or acrylonitrile butadiene styrene (ABS), and which are of differing orientations, locations, sizes and/or shapes. A pipe coupling may be used to fluidically couple multiple sections of plastic pipes as part of the DWV system, to for example, convey water from the water main to be supplied to a bathroom.

Various pipe fittings are commercially available to permit different required manipulation or regulation of fluid flow, including an elbow, a coupling, a reducer, a tee, a wye and a tee-wye. For instance, pipe couplings are commercially available to simply connect two pipes of the same or different sizes, by providing a straight coupling body fluidically coupling the two pipes. As a further example, an elbow or a sweep elbow may be utilized to redirect fluid flow from a vertically oriented plastic pipe to a horizontally oriented plastic pipe, by providing a fitting body curved at 90° fluidically coupled to both the vertically oriented and horizontally plastic pipes.

To fluidically couple or join the pipes with a pipe fitting, various connection techniques are available, such as threaded connection, solvent welding and others, often dependent on the pipe material. For instance, with a DWV system typically utilizing plastic pipes, pipe-to-pipe and pipe-to-fitting connections may be established with use of a solvent cement, an adhesive, fusion or other bonding techniques to achieve a relatively permanent connection. To implement a less permanent and removable connection, various techniques that are more mechanical in nature have been proposed.

For instance, International Publication No. WO 2009/108963 to Van Wyk describes a pipe coupling body 10 for receiving a pipe 12, and a gripping member 20 for holding the pipe 12 in the bod 10. The gripping member is formed with a sleeve 32 and a grip ring 30 located at an axial end of the sleeve 32, where the ring 30 has teeth 34 extending radially inwardly at an angle in the direction of pipe insertion. For securing the grip member 20 over an opening of the body 10, the body 10 has radial ridges 24, and the sleeve 32 defines keyhole slots 36 sized to receive the ridges 24 therein. FIG. 3 shows an alternative embodiment of the gripping member 20 having the grip ring 30 and not the sleeve 32, and which rather includes multiple feet 46 extending from a periphery of the ring 30. Each foot 46 has an inwardly oriented projection for engaging a distal sidewall of the ridge 24, and thus, locking the member 20 to the body 10.

U.S. Pat. No. 10,047,884 to Taylor describes a push connector 100 having a housing body 102, sealing members 104, a locking member 106 and a retaining member 108. The body 102 has threaded portions 134, 136 near axial ends of the body 102, and defines an axial bore 110 to receive the sealing member 104 and the locking member 106. The member 106 includes an annular ring 142 and locking teeth 146 operable as a one-way stop for a tube to be received in the bore 110, and the ring 142 is sized to be positioned on a top abutment 154 near the axial end of the body 102. To retain the member 104, 106 in the axial bore 110, the retaining member 108 has an internally threaded portion 150 for threaded engagement with the threaded portion 134 of the body 102, and the tube can be inserted into the bore 110 to be retained therein by the locking member 106. To remove the tube, the retaining member 108 may be removed from the body 102, and the connector 100 can optionally include a release mechanism for disengaging the teeth 146 from the pipe.

U.S. Pat. No. 7,195,287 to Wai describes a fitting for coupling a pipe to a pipe joint 6 having internal threads near a joint opening. The fitting is provided with a combination of outer and inner rings 1,2, an internal teethed lock ring 3, a locking sleeve 4 and an elastic sealing ring 5. The ring 5 is shaped for sealingly abutting an end of the pipe when placed in the joint 6, and the locating sleeve 4 is for positioning between the sealing ring 5 and the lock ring 3, and the inner ring 2 engages the lock ring 3 opposite the sleeve 4. The inner ring 2 has an axial end face tapering towards the lock ring 3, and which is configured to urge the internal teeth of the lock ring 3 radially outwardly when pressed against the teeth. The inner ring 2 has outer threads for complementary engagement with internal threads of the outer ring 1, and the outer ring 1 has outer threads for complementary engagement with the internal threads of the joint 6. After components 1 to 5 are placed into the pipe joint 6 with the outer threads of the outer ring 1 engaging the internal threads of the pipe joint 6, the ring 1 can be integrated to the joint 6 by for example using glue to prevent the ring 1 from being removed from the joint 6. The pip can then be inserted into the joint 6 through the components 1 to 5, with the internal teeth of the lock ring 3 engaging an outer surface of the pipe. The pipe can be removed form the joint 6 by threaded rotation, and thus longitudinal movement, of the inner ring 2 relative to the outer ring 3, such that the ring 2 presses against the lock ring 3 to release the internal teeth from the pipe.

SUMMARY OF THE INVENTION

One possible non-limiting object of the present invention to provide a pipe fitting which may permit more ready or convenient fluid connection between two or more fluid pipes, such as a plastic pipe or a PVC, CPVC or ABS pipe for use in a DWV system.

Another possible non-limiting object of the present invention is to provide a pipe fitting which may permit a fluid connection between two or more fluid pipes that is more mechanical in nature, and without necessary requiring use of a solvent cement, adhesive fusion or other similar or permanent connection techniques.

Another possible non-limiting object of the present invention is to provide a pipe fitting which may permit more ready disconnection between connected fluid pipes without necessarily requiring complex tools or procedures, and which, at the same time, may allow for reconnecting the fluid pipes in varying environmental conditions.

In one aspect, the present invention provides a pipe fitting comprising a coupling body having two or more open ends and a pipe engagement assembly for attachment to the open end for engagement of a pipe thereto, the pipe engagement assembly comprising a retainer ring and a grip ring, and the coupling body comprising a sidewall defining an internal bore sized for receiving at least a portion of the pipe and the retainer ring, the retainer ring being dimensioned to be received at least partially by the grip ring and to receive the pipe therethrough, wherein the grip ring comprises a plurality of first projections extending inwardly towards the bore to engage the pipe, and the retainer ring comprises one or more second projections extending outwardly to releasably engage the sidewall, the retainer ring defining a plurality of slots sized to receive the first projections therethrough, wherein the slots are positioned to retain the first projections with the grip ring engaging the pipe and the second projections engaging the sidewall, thereby retaining the grip ring and the pipe to the open end.

In another aspect, the present invention provides a pipe fitting comprising an elongate coupling body having opposed open ends and a pipe engagement assembly for attachment to the open end for engagement of a pipe thereto, the pipe engagement assembly comprising a retainer ring and a grip ring, and the coupling body comprising a sidewall defining an internal bore sized for receiving at least a portion of the pipe and the retainer ring, the retainer ring being dimensioned to be received at least partially by the grip ring and to receive the pipe therethrough, wherein the coupling body further comprises a stop flange extending inwardly from the sidewall for abutting contact with a longitudinal end of the pipe, and wherein the grip ring comprises a first projection extending inwardly towards the bore to engage the pipe, and the retainer ring comprises a second projection extending outwardly to releasably engage the sidewall, the retainer ring further comprising a retainer ring sidewall having first and second axial ends, the first axial end being shaped for abutting contact with the first projection proximate to the stop flange relative to the second axial end, wherein the first axial end is positioned to retain the first projection with the grip ring engaging the pipe and the second projection engaging the sidewall, thereby retaining the grip ring and the pipe to the open end.

In yet another aspect, the present invention provides A pipe fitting assembly comprising a pipe and a pipe fitting, the pipe fitting comprising an elongate coupling body having opposed open ends and a pipe engagement assembly for attachment to the open end for engagement of a pipe thereto, the pipe engagement assembly comprising a retainer ring and a grip ring, and the coupling body comprising a sidewall defining an internal bore sized for receiving at least a portion of the pipe and the retainer ring, the retainer ring being dimensioned to be received at least partially by the grip ring and to receive the pipe therethrough, wherein the coupling body further comprises a stop flange extending inwardly from the sidewall for abutting contact with a longitudinal end of the pipe, wherein the grip ring comprises a plurality of first projections extending inwardly towards the bore to engage the pipe, and the retainer ring comprises one or more second projections extending outwardly to releasably engage the sidewall, the retainer ring defining a plurality of slots sized to receive the first projections therethrough, wherein the slots are positioned to retain the first projections with the grip ring engaging the pipe and the second projections engaging the sidewall, thereby retaining the grip ring and the pipe to the open end, and wherein the sidewall defines one or more apertures located for receiving the one or more second projections, each said second projection comprising a cantilever arm extending along a longitudinal axis of the retainer ring to an outwardly extending protrusion for snap fit engagement in an associated one of the apertures.

In one embodiment, the coupling body further comprises a stop flange extending inwardly from the sidewall for abutting contact with a longitudinal end of the pipe, and the internal bore comprises an enlarged diameter portion and a reduced diameter portion interposed between the enlarged diameter portion and the stop flange, wherein the enlarged diameter portion is sized for receiving the retainer ring, and the reduced diameter portion is sized for receiving the longitudinal end of the pipe.

In one embodiment, the pipe engagement assembly further comprises a resiliently deformable gasket shaped to be received in the enlarged diameter portion adjacent to the reduced diameter portion in fluid sealing contact with the pipe, and wherein the retainer ring is dimensioned for preventing movement of the gasket towards the open end when the pipe is received through the gasket and the retainer ring. In one embodiment, the gasket is an elastomeric gasket having a ring shape dimensioned to operate as a mechanical seal between the pipe and the coupling body to prevent outward fluid movement therefrom. In one embodiment, the coupling body comprises a shoulder formed between the enlarged and reduced diameter portions, the coupling body further comprising a seating rim extending from the shoulder towards the open end in the enlarged diameter portion spaced from the sidewall, and the gasket comprises a lip sized for insertion between the seating rim and the sidewall in the enlarged diameter portion.

In one embodiment, the internal bore further comprises a further enlarged diameter portion interposed between the enlarged diameter portion and the open end, the further enlarged diameter portion being sized to at least partially receive the grip ring, and the first projections comprise gripping teeth angled inwardly towards the stop flange to resist movement of the pipe away from the stop flange. The inward angle formed by the gripping teeth is not strictly limited, provided that the gripping teeth are oriented to resist or prevent outward movement of the pipe from the coupling body, and may be, for example, relative to a longitudinal axis of the grip ring, between about 5° and about 80°, preferably between about 10° and about 40° or more preferably between about 15° and about 30°. In one embodiment, the first projections comprise between about 1 and about 60 gripping teeth, preferably between about 10 and 50 gripping teeth or more preferably between about 20 and 40 gripping teeth.

In one embodiment, the retainer ring comprises a retainer ring sidewall having first and second axial ends, the first axial end being for placement proximate to the stop flange relative to the second axial end, and the slots are open ended slots defined along a periphery of the first axial end to receive the gripping teeth therein with the grip ring received in the further enlarged diameter portion and the first axial end inserted into the enlarged diameter portion. In an alternative embodiment, the slots are not open ended slots; rather, the slots are interposed between the first and second axial ends, preferably proximal to the first axial end of the retainer ring sidewall. In that alternative embodiment, the gripping teeth are preferably resiliently biased to maintain the inward angle, such that the gripping teeth may be retracted outwardly against the bias to permit the retainer ring to be received by the grip ring, and revert to the inward angle when the gripping teeth are aligned with the slots.

In one embodiment, the first axial end comprises a beveled or chamfered rim profiled for complementary abutting contact with an angled surface or an angled inner surface of the gripping teeth, whereby the retainer ring resists movement of the grip ring away from the coupling body with the second projection engaging the sidewall and when a pulling force is applied to the pipe in engagement with the grip ring. It is to be thus appreciated that the retainer ring is not strictly required to define the slots or the open ended slots to receive the first projection or projections, provided that the retainer ring operates to resist or prevent movement of the grip ring away from the coupling body.

In one embodiment, the retainer ring further comprises a plurality of spaced apart posts extending along a longitudinal axis of the retainer ring from the rim to define a plurality of open ended slots sized to receive the gripping teeth therein with the grip ring received in the further enlarged diameter portion and the first axial end inserted into the enlarged diameter portion.

In one embodiment, the slots or the open ended slots are profiled for complementary abutting contact with an angled surface or an angled inner surface of the gripping teeth, whereby the retainer ring resists movement of the grip ring away from the coupling body with the second projections engaging the sidewall and when a pulling force is applied to the pipe in engagement with the grip ring. In one embodiment, the grip ring is a metal grip ring, and the pipe is a plastic pipe preferably prepared with polyvinyl chloride, chlorinated polyvinyl chloride or acrylonitrile butadiene styrene. In one embodiment, the metal grip ring comprises a sharpened edge positioned for contacting against a pipe outer wall. It has been envisioned that in that embodiment, a pulling force applied to the pipe may urge the gripping teeth radially inwardly, driving the sharpened edge at least partially into the pipe to resist or prevent outward movement of the pipe.

In one embodiment, the sidewall defines one or more apertures located for receiving the one or more second projections, each said second projection comprising a cantilever arm extending along a longitudinal axis of the retainer ring from the first axial end to an outwardly extending protrusion for snap fit engagement in an associated one of the apertures. In one embodiment, the retainer ring comprises two or more said cantilever arms spaced around the periphery of the first axial end and the slots or the open ended slots are interposed between the cantilever arms, wherein the cantilever arm is sized to locate the protrusion past the grip ring towards the stop flange. In one embodiment, the retainer ring comprises two, three or four said cantilever arms evenly spaced around the periphery of the first axial end.

In one embodiment, each said aperture traverses through a thickness of the sidewall, thereby permitting removal of the protrusion from the aperture by application of an inward force against the protrusion through the aperture, and the second axial end comprises a cover flange extending outwardly past the grip ring.

It is to be appreciated that the pipe fitting may include or permit incorporation as part of an elbow, a sweep elbow, a coupling, a reducer, a tee, a cross, a wye or a combination thereof. It is to be also appreciated that the specific dimensions, shape and materials of the pipe, pipe fitting and pipe fitting assembly are not particularly limited.

In yet another aspect, the present invention provides a pipe fitting comprising a coupling body having two or more open ends and a pipe engagement assembly for attachment to the open end for engagement of a pipe thereto, the pipe engagement assembly comprising a retainer ring, an unlocking ring and a grip ring, and the coupling body comprising a sidewall defining an internal bore sized for receiving at least a portion of the pipe and the retainer ring, the retainer ring being dimensioned to be received at least partially by the grip ring and to receive the pipe therethrough, wherein the grip ring comprises a plurality of first projections extending inwardly towards the bore to engage the pipe, and the retainer ring comprises one or more second projections extending outwardly to releasably engage the sidewall, the retainer ring defining a plurality of slots sized to receive the first projections therethrough, wherein the slots are positioned to retain the first projections with the grip ring engaging the pipe and the second projections engaging the sidewall, thereby retaining the grip ring and the pipe to the open end, and wherein the unlocking ring is dimensioned to be received at least partially by the retainer ring, the unlocking ring comprising a disengagement portion shaped for disengaging the first projections from the pipe.

In one embodiment, the coupling body further comprises a stop flange extending inwardly from the sidewall for abutting contact with a longitudinal end of the pipe, and the internal bore comprises an enlarged diameter portion and a reduced diameter portion interposed between the enlarged diameter portion and the stop flange, wherein the enlarged diameter portion is sized for receiving at least the retainer ring, and the reduced diameter portion is sized for receiving the longitudinal end of the pipe.

In one embodiment, the internal bore further comprises a gasket receiving portion interposed between the enlarged and reduced diameter portions, and the pipe engagement assembly further comprises a resiliently deformable gasket shaped to be received in the gasket receiving portion adjacent to the reduced diameter portion in fluid sealing contact with the pipe.

In one embodiment, the first projections comprise gripping teeth angled inwardly towards the stop flange to resist movement of the pipe away from the stop flange, and wherein the retainer ring comprises a retainer ring sidewall having first and second axial ends, the first axial end being for placement proximate to the stop flange relative to the second axial end, and the slots are open ended slots defined along a periphery of the first axial end to receive the gripping teeth therein with the grip ring and the first axial end inserted into the enlarged diameter portion.

In one embodiment, the open ended slots are profiled for complementary abutting contact with an angled surface of the gripping teeth, whereby the retainer ring resists movement of the grip ring away from the coupling body with the second projections engaging the sidewall and when a pulling force is applied to the pipe in engagement with the grip ring.

In one embodiment, the sidewall defines one or more apertures located for receiving the one or more second projections, each said second projection comprising a cantilever arm extending along a longitudinal axis of the retainer ring from the first axial end to an outwardly extending protrusion for snap fit engagement in an associated one of the apertures.

In one embodiment, the retainer ring comprises two or more said cantilever arms spaced around the periphery of the first axial end and the open ended slots are interposed between the cantilever arms, wherein the cantilever arm is sized to locate the protrusion past the grip ring towards the stop flange.

In one embodiment, each said aperture traverses through a thickness of the sidewall, thereby permitting removal of the protrusion from the aperture by application of an inward force against the protrusion through the aperture.

In one embodiment, the unlocking ring is movable towards an unlocking position, whereby the disengagement portion urges the first projections outwardly to disengage from the pipe.

In one embodiment, the unlocking ring comprises an unlocking ring sidewall having first and second longitudinal ends, the first longitudinal end being for placement proximate to the first projections relative to the second longitudinal end, wherein the first longitudinal end comprises the disengagement portion beveled towards the first projections.

In one embodiment, the unlocking ring sidewall comprises inner and outer surfaces, the outer surface defining an outwardly open groove interposed between the first and second longitudinal ends, and the retainer ring comprises an inwardly extending collar positioned to be received in the groove, whereby the unlocking ring and the retainer ring are movably coupled relative to each other, and wherein the inner surface is dimensioned for abutting engagement with the pipe.

In one embodiment, unlocking ring sidewall is sized to locate the second longitudinal end past the retainer ring, the second longitudinal end comprising a handle flange for applying a longitudinal force to move the unlocking ring towards the unlocking position.

In one embodiment, the unlocking ring sidewall is sized to locate the second longitudinal end in the retainer ring, the second longitudinal end comprising a contact surface for use with an unlocking ring tool shaped for longitudinal insertion between the retainer ring and the pipe and transmit a longitudinal force to the contact surface to thereby move the unlocking ring towards the unlocking position.

In aspect (1), there is provided a pipe fitting comprising a coupling body having two or more open ends and a pipe engagement assembly for attachment to the open end for engagement of a pipe thereto, the pipe engagement assembly comprising a retainer ring and a grip ring, and the coupling body comprising a sidewall defining an internal bore sized for receiving at least a portion of the pipe and the retainer ring, the retainer ring being dimensioned to be received at least partially by the grip ring and to receive the pipe therethrough, wherein the grip ring comprises a plurality of first projections extending inwardly towards the bore to engage the pipe, and the retainer ring comprises one or more second projections extending outwardly to releasably engage the sidewall, the retainer ring defining a plurality of slots sized to receive the first projections therethrough, wherein the slots are positioned to retain the first projections with the grip ring engaging the pipe and the second projections engaging the sidewall, thereby retaining the grip ring and the pipe to the open end.

In Aspect (2), there is provided a pipe fitting comprising an elongate coupling body having opposed open ends and a pipe engagement assembly for attachment to the open end for engagement of a pipe thereto, the pipe engagement assembly comprising a retainer ring and a grip ring, and the coupling body comprising a sidewall defining an internal bore sized for receiving at least a portion of the pipe and the retainer ring, the retainer ring being dimensioned to be received at least partially by the grip ring and to receive the pipe therethrough, wherein the coupling body further comprises a stop flange extending inwardly from the sidewall for abutting contact with a longitudinal end of the pipe, and wherein the grip ring comprises a first projection extending inwardly towards the bore to engage the pipe, and the retainer ring comprises a second projection extending outwardly to releasably engage the sidewall, the retainer ring further comprising a retainer ring sidewall having first and second axial ends, the first axial end being shaped for abutting contact with the first projection proximate to the stop flange relative to the second axial end, wherein the first axial end is positioned to retain the first projection with the grip ring engaging the pipe and the second projection engaging the sidewall, thereby retaining the grip ring and the pipe to the open end.

In aspect (3), there is provided a pipe fitting assembly comprising a pipe and a pipe fitting, the pipe fitting comprising an elongate coupling body having opposed open ends and a pipe engagement assembly for attachment to the open end for engagement of a pipe thereto, the pipe engagement assembly comprising a retainer ring and a grip ring, and the coupling body comprising a sidewall defining an internal bore sized for receiving at least a portion of the pipe and the retainer ring, the retainer ring being dimensioned to be received at least partially by the grip ring and to receive the pipe therethrough, wherein the coupling body further comprises a stop flange extending inwardly from the sidewall for abutting contact with a longitudinal end of the pipe, wherein the grip ring comprises a plurality of first projections extending inwardly towards the bore to engage the pipe, and the retainer ring comprises one or more second projections extending outwardly to releasably engage the sidewall, the retainer ring defining a plurality of slots sized to receive the first projections therethrough, wherein the slots are positioned to retain the first projections with the grip ring engaging the pipe and the second projections engaging the sidewall, thereby retaining the grip ring and the pipe to the open end, and wherein the sidewall defines one or more apertures located for receiving the one or more second projections, each said second projection comprising a cantilever arm extending along a longitudinal axis of the retainer ring to an outwardly extending protrusion for snap fit engagement in an associated one of the apertures.

In aspect (4), there is provided a pipe fitting or a pipe fitting assembly according to one or more of aspects (1) to (3) and (5) to (27) in any combination, wherein the coupling body further comprises a stop flange extending inwardly from the sidewall for abutting contact with a longitudinal end of the pipe, and the internal bore comprises an enlarged diameter portion and a reduced diameter portion interposed between the enlarged diameter portion and the stop flange, wherein the enlarged diameter portion is sized for receiving the retainer ring, and the reduced diameter portion is sized for receiving the longitudinal end of the pipe.

In aspect (5), there is provided a pipe fitting or a pipe fitting assembly according to one or more of aspects (1) to (4) and (6) to (27) in any combination, wherein the pipe engagement assembly further comprises a resiliently deformable gasket shaped to be received in the enlarged diameter portion adjacent to the reduced diameter portion in fluid sealing contact with the pipe, and wherein the retainer ring is dimensioned for preventing movement of the gasket towards the open end when the pipe is received through the gasket and the retainer ring.

In aspect (6), there is provided a pipe fitting or a pipe fitting assembly according to one or more of aspects (1) to (5) and (7) to (27) in any combination, wherein the internal bore further comprises a further enlarged diameter portion interposed between the enlarged diameter portion and the open end, the further enlarged diameter portion being sized to at least partially receive the grip ring, and the first projections comprise gripping teeth angled inwardly towards the stop flange to resist movement of the pipe away from the stop flange.

In aspect (7), there is provided a pipe fitting or a pipe fitting assembly according to one or more of aspects (1) to (6) and (8) to (27) in any combination. Wherein the retainer ring comprises a retainer ring sidewall having first and second axial ends, the first axial end being for placement proximate to the stop flange relative to the second axial end, and the slots are open ended slots defined along a periphery of the first axial end to receive the gripping teeth therein with the grip ring received in the further enlarged diameter portion and the first axial end inserted into the enlarged diameter portion.

In aspect (8), there is provided a pipe fitting or a pipe fitting assembly according to one or more of aspects (1) to (7) and (9) to (27) in any combination, wherein the open ended slots are profiled for complementary abutting contact with an angled surface of the gripping teeth, whereby the retainer ring resists movement of the grip ring away from the coupling body with the second projections engaging the sidewall and when a pulling force is applied to the pipe in engagement with the grip ring.

In aspect (9), there is provided a pipe fitting or a pipe fitting assembly according to one or more of aspects (1) to (8) and (10) to (27) in any combination, wherein the sidewall defines one or more apertures located for receiving the one or more second projections, each said second projection comprising a cantilever arm extending along a longitudinal axis of the retainer ring from the first axial end to an outwardly extending protrusion for snap fit engagement in an associated one of the apertures.

In aspect (10), there is provided a pipe fitting or a pipe fining assembly according to one or more of aspects (1) to (9) and (11) to (27) in any combination, wherein the retainer ring comprises two or more said cantilever arms spaced around the periphery of the first axial end and the open ended slots are interposed between the cantilever arms, wherein the cantilever arm is sized to locate the protrusion past the grip ring towards the stop flange.

In aspect (11), there is provided a pipe fitting or a pipe fitting assembly according to one or more of aspects (1) to (10) and (12) to (27) in any combination, wherein each said aperture traverses through a thickness of the sidewall, thereby permitting removal of the protrusion from the aperture by application of an inward force against the protrusion through the aperture, and the second axial end comprises a cover flange extending outwardly past the grip ring.

In aspect (12), there is provided a pipe fitting or a pipe fitting assembly according to one or more of aspects (1) to (11) and (13) to (27) in any combination, wherein the internal bore comprises an enlarged diameter portion and a reduced diameter portion interposed between the enlarged diameter portion and the stop flange, wherein the enlarged diameter portion is sized for receiving the retainer ring, and the reduced diameter portion is sized for receiving the longitudinal end of the pipe.

In aspect (13), there is provided a pipe fitting or a pipe fitting assembly according to one or more of aspects (1) to (12) and (14) to (27) in any combination, wherein the pipe engagement assembly further comprises a resiliently deformable gasket shaped to be received in the enlarged diameter portion adjacent to the reduced diameter portion in fluid sealing contact with the pipe, and wherein the retainer ring is dimensioned for preventing movement of the gasket towards the open end when the pipe is received through the gasket and the retainer ring.

In aspect (14), there is provided a pipe fitting or a pipe fitting assembly according to one or more of aspects (1) to (13) and (15) to (27) in any combination, wherein the internal bore further comprises a further enlarged diameter portion interposed between the enlarged diameter portion and the open end, the further enlarged diameter portion being sized to at least partially receive the grip ring, and the first projection comprises a plurality of gripping teeth angled inwardly towards the stop flange to resist movement of the pipe away from the stop flange.

In aspect (15), there is provided a pipe fitting or a pipe fitting assembly according to one or more of aspects (1) to (14) and (16) to (27) in any combination, wherein the first axial end comprises a beveled or chamfered rim profiled for complementary abutting contact with an angled surface of the gripping teeth, whereby the retainer ring resists movement of the grip ring away from the coupling body with the second projection engaging the sidewall and when a pulling force is applied to the pipe in engagement with the grip ring.

In aspect (16), there is provided a pipe fitting or a pipe fitting assembly according to one or more of aspects (1) to (15) and (17) to (27) in any combination, wherein the retainer ring further comprises a plurality of spaced apart posts extending along a longitudinal axis of the retainer ring from the rim to define a plurality of open ended slots sized to receive the gripping teeth therein with the grip ring received in the further enlarged diameter portion and the first axial end inserted into the enlarged diameter portion.

In aspect (17), there is provided a pipe fitting or a pipe fitting assembly according to one or more of aspects (1) to (16) and (18) to (27) in any combination, wherein the sidewall defines an aperture located for receiving the second projection, the second projection comprising a cantilever arm extending along the longitudinal axis of the retainer ring from the first axial end to an outwardly extending protrusion for snap fit engagement in the aperture.

In aspect (18), there is provided a pipe fitting or a pipe fitting assembly according to one or more of aspects (1) to (17) and (19) to (27) in any combination, wherein the retainer ring comprises two or more said cantilever arms spaced around a periphery of the first axial end and the open ended slots are interposed between the cantilever arms, wherein the cantilever is sized to locate the protrusion past the grip ring towards the stop flange.

In aspect (19), there is provided a pipe fitting or a pipe fitting assembly according to one or more of aspects (1) to (18) and (20) to (27) in any combination, wherein the aperture traverses through a thickness of the sidewall, thereby permitting removal of the protrusion from the aperture by application of an inward force against the protrusion through the aperture, and the second axial end comprises a cover flange extending outwardly past the grip ring.

In aspect (20), there is provided a pipe fitting or a pipe fitting assembly according to one or more of aspects (1) to (19) and (21) to (27) in any combination, wherein the pipe fitting comprises two said pipe engagement assemblies for attachment to the respective opposed open ends for engagement of two said pipes thereto, thereby fluidically coupling said two pipes.

In aspect (21), there is provided a pipe fitting or a pipe fitting assembly according to one or more of aspects (1) to (20) and (22) to (27) in any combination, wherein the internal bore comprises an enlarged diameter portion and a reduced diameter portion interposed between the enlarged diameter portion and the stop flange, wherein the enlarged diameter portion is sized for receiving the retainer ring, and the reduced diameter portion is sized for receiving the longitudinal end of the pipe.

In aspect (22), there is provided a pipe fitting or a pipe fitting assembly according to one or more of aspects (1) to (21) and (23) to (27) in any combination, wherein the pipe engagement assembly further comprises a resiliently deformable gasket shaped to be received in the enlarged diameter portion adjacent to the reduced diameter portion in fluid sealing contact with the pipe, and wherein the retainer ring is dimensioned for preventing movement of the gasket towards the open end when the pipe is received through the gasket and the retainer ring.

In aspect (23), there is provided a pipe fitting or a pipe fitting assembly according to one or more of aspects (1) to (22) and (24) to (27) in any combination, wherein the internal bore further comprises a further enlarged diameter portion interposed between the enlarged diameter portion and the open end, the further enlarged diameter portion being sized to at least partially receive the grip ring, and the first projections comprise gripping teeth angled inwardly towards the stop flange to resist movement of the pipe away from the stop flange.

In aspect (24), there is provided a pipe fitting or a pipe fitting assembly according to one or more of aspects (1) to (23) and (25) to (27) in any combination, wherein the retainer ring comprises a retainer ring sidewall having first and second axial ends, the first axial end being for placement proximate to the stop flange relative to the second axial end, and the slots are open ended slots defined along a periphery of the first axial end to receive the gripping teeth therein with the grip ring received in the further enlarged diameter portion and the first axial end inserted into the enlarged diameter portion.

In aspect (25), there is provided a pipe fitting or a pipe fitting assembly according to one or more of aspects (1) to (24) and (26) to (27) in any combination, wherein the open ended slots are profiled for complementary abutting contact with an angled surface of the gripping teeth, whereby the retainer ring resists movement of the grip ring away from the coupling body with the protrusion in snap fit engagement in the aperture and when a pulling force is applied to the pipe in engagement with the grip ring.

In aspect (26), there is provided a pipe fitting or a pipe fitting assembly according to one or more of aspects (1) to (25) and (27) in any combination, wherein the retainer ring comprises two or more said cantilever arms spaced around the periphery of the first axial end and the open ended slots are interposed between the cantilever arms, wherein the cantilever arm is sized to locate the protrusion past the grip ring towards the stop flange.

In aspect (27), there is provided a pipe fitting or a pipe fitting assembly according to one or more of aspects (1) to (26) in any combination, wherein each said aperture traverses through a thickness of the sidewall, thereby permitting removal of the protrusion from the aperture by application of an inward force against the protrusion through the aperture.

Additional and alternative features of the present invention will be apparent to a person skilled in the art from the following detailed description of the preferred embodiments thereof.

BRIEF DESCRIPTION OF THE DRAWINGS

Reference may now be had to the following detailed description taken together with the accompanying drawings in which.

DETAILED DESCRIPTION OF THE PREFERRED EMBODIMENTS

Figure 1:
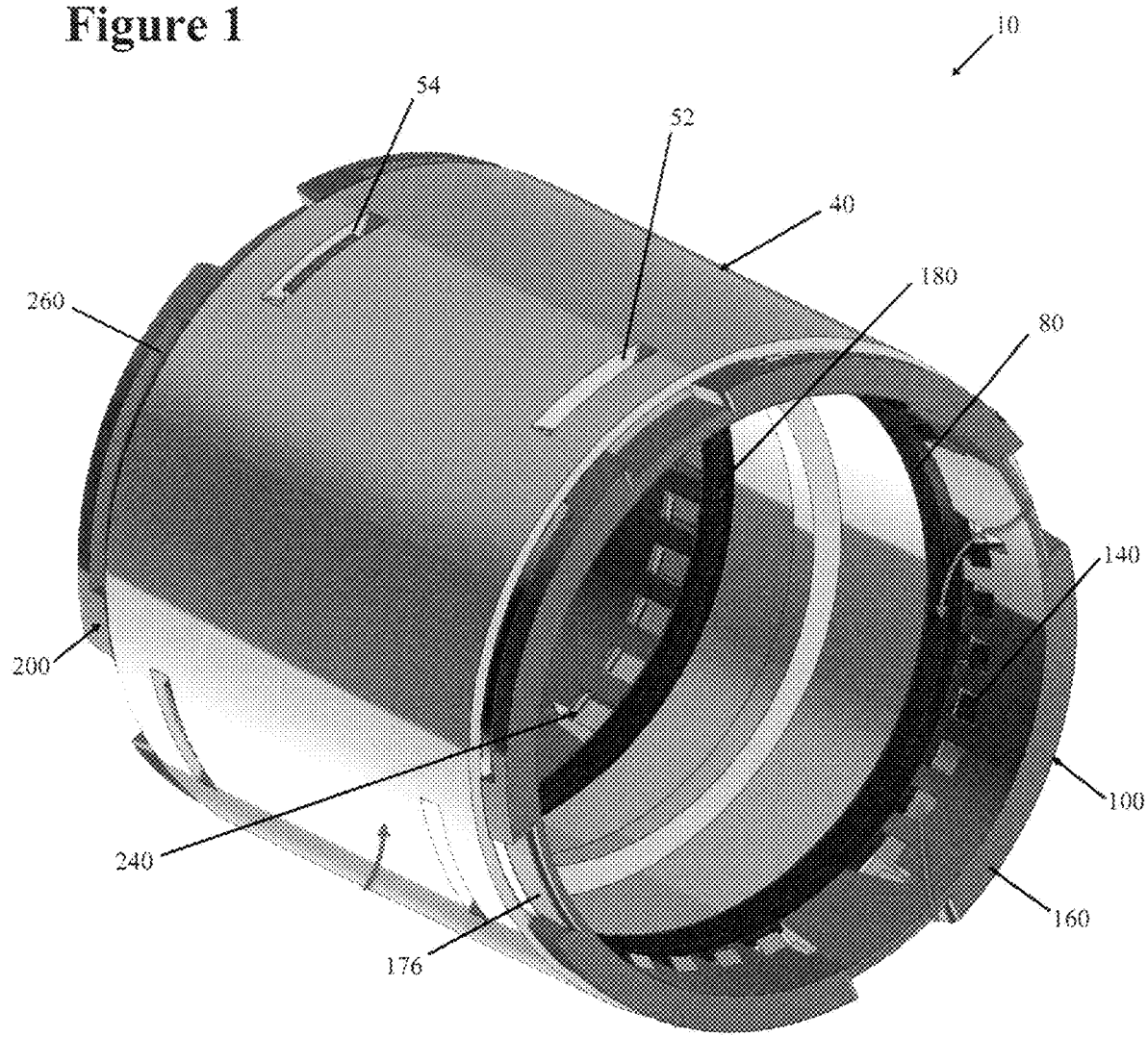
FIG. 1 is a perspective view of a pipe coupling in accordance with a preferred embodiment of the present invention.

Reference is made to FIG. 1 which shows a perspective view of a pipe coupling 10 for fluidically connecting two PVC, CPVC or ABS pipes, in accordance with a preferred embodiment of the present invention. In the construction shown, and as will be further described below, the pipe coupling 10 includes an elongate body or sleeve 40, an elastomeric gasket 80, 180 and a pair of pipe engagement assemblies 100, 200 each having a grip ring 140, 240 and a retainer ring 160, 260. As will be further explained below, the pipe engagement assemblies 100, 200 and the components thereof are identical to each other.

Figure 2:
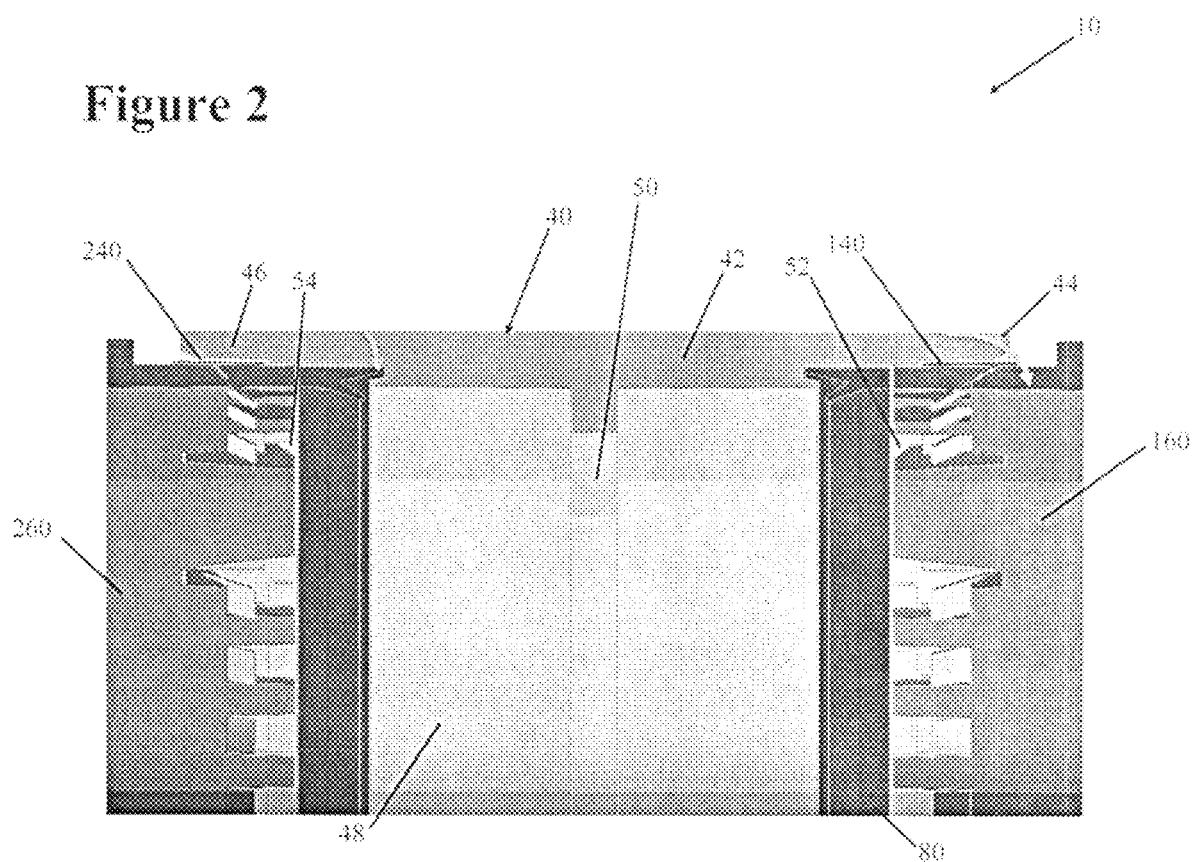
FIG. 2 is a partial lateral cross sectional view of the pipe coupling shown in FIG. 1.

As seen in FIGS. 1 and 2, the sleeve 40 has a generally cylindrical shape formed with a sidewall 42 having opposed first and second axial ends 44, 46 and defining an internal bore 48 therebetween. The sleeve 40 also includes a stop flange 50 extending inwardly from the sidewall 42 between the ends 44, 46. As seen in FIG. 1, the sidewall 42 also defines four generally rectangular apertures 52 extending through a thickness of the sidewall 42, and which are spaced annularly proximate the first axial end 44. The sidewall 42 further defines proximate the second axial end 46 four generally rectangular apertures 54 substantially identical to the apertures 52, with the exception that the apertures 52 are proximate the other axial end 44.

Figure 4:
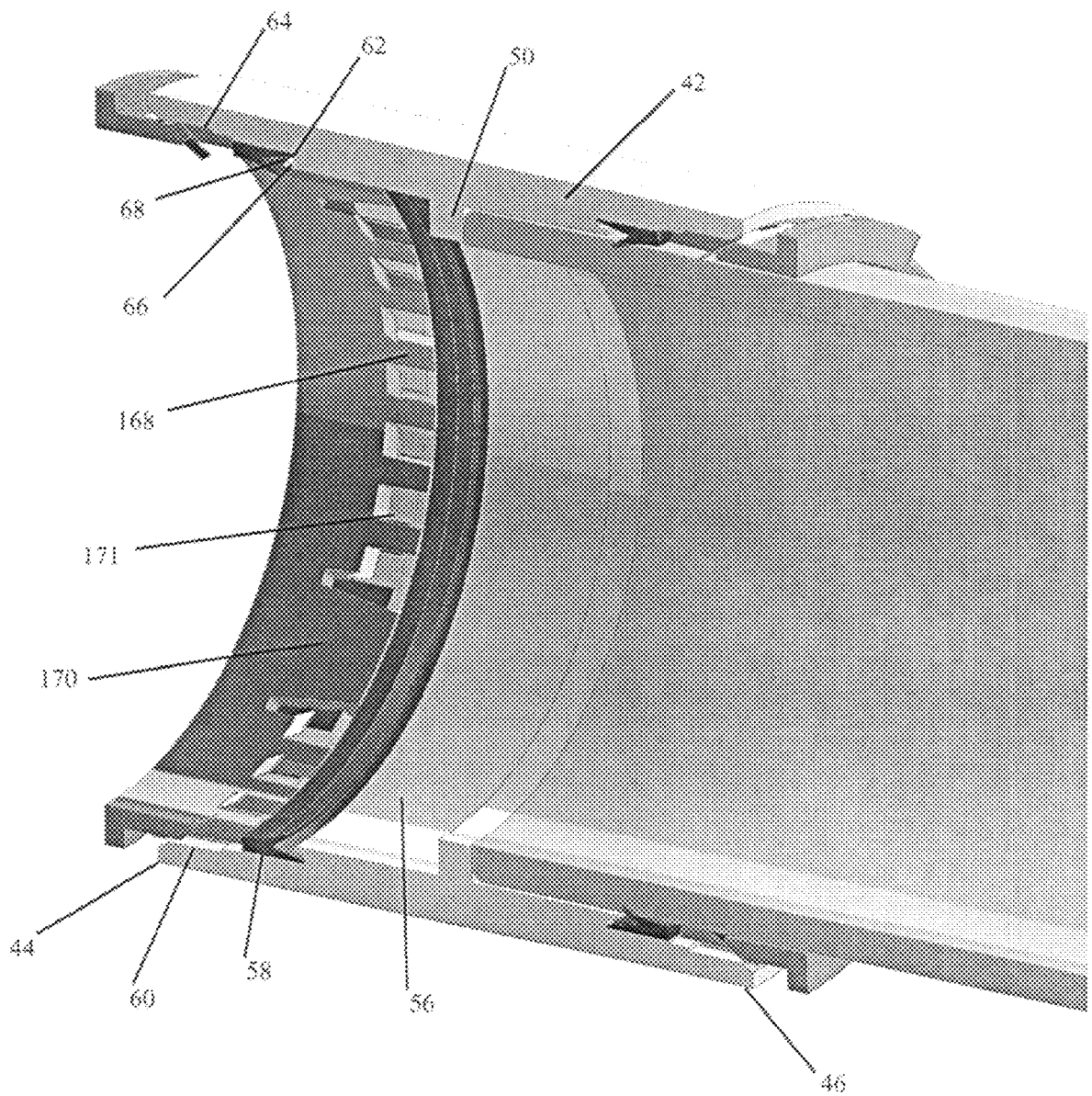
FIG. 4 is a perspective cross sectional view of the pipe coupling shown in FIG. 1, and in use with a plastic pipe.

As seen from FIGS. 1, 2 and 4, the sleeve 40 from the stop flange 50 towards the first axial end 44 forms a mirror image from the flange 50 towards the second axial end 46. Furthermore, as noted above, the pipe engagement assembly 100 is also identical to the assembly 200, with a difference therebetween being that the assembly 100 is for engagement with the first axial end 44, and the assembly 200 the second axial end 46. For a simpler and clearer understanding of the pipe coupling 10, the first axial end 44 and engagement of the assembly 100 thereto only will be described.

As seen in FIG. 4, the sidewall 42 defines between the stop flange 50 and the first axial end 44 three main portions, or namely, a reduced diameter portion 56, an enlarged diameter portion 58 and a further enlarged diameter portion 60, in the order of increasing diameter towards the axial end 44. The increase in diameter from the reduced dimeter portion 56 to the enlarged diameter portion 58 is effected with inclusion in the sidewall 42 a first shoulder 62 located therebetween, and likewise, the increase in diameter from the portion 58 to the further enlarged diameter portion 60 is effected with a second shoulder 64 located therebetween. The sidewall 42 further includes an annular ridge 66 extending towards the first axial end 44, and spaced from the sidewall 42, so as to define an annular pocket 68 therebetween.

Figure 5:
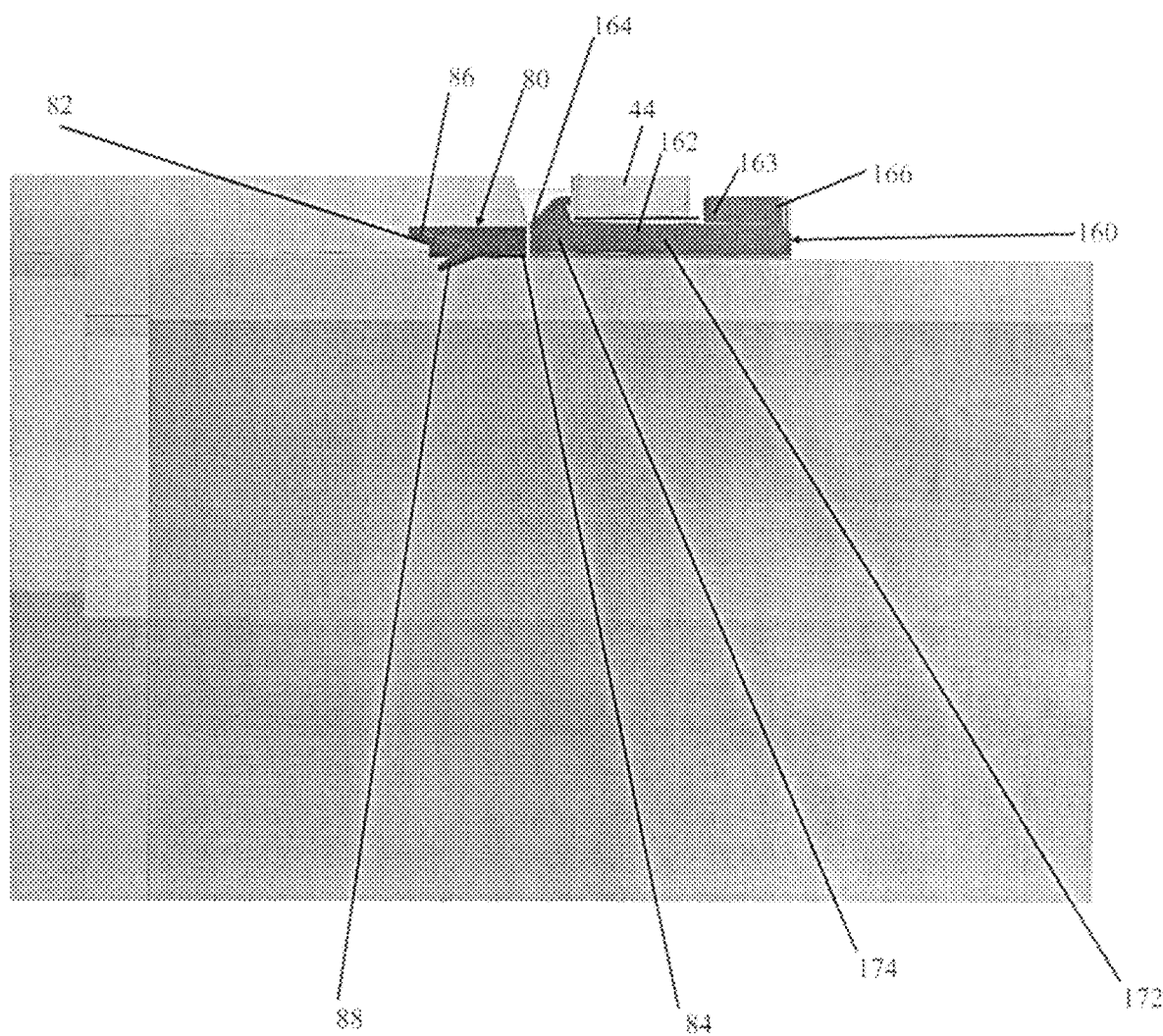
FIG. 5 is a lateral cross sectional view of the pipe coupling in use with a plastic pipe shown in FIG. 4.

As seen in FIG. 5, the gasket 80 has a generally ring-like shape with gasket proximal and distal ends 82, 84. The proximal end 82 has an outer annular lip 86 sized for insertion and engagement in the annular pocket 68 when the gasket 80 is received in the sleeve 40, as will be further described below. The proximal end 82 also includes an inner annular seal 88 angled inwardly to deformably abut against an outer surface of the pipe when received in the sleeve 40, as will be further described below. Furthermore, an outer surface of the gasket 80 is dimensioned to frictionally engage an inner surface of the sidewall 42 in the enlarged diameter portion 58.

Figure 3:
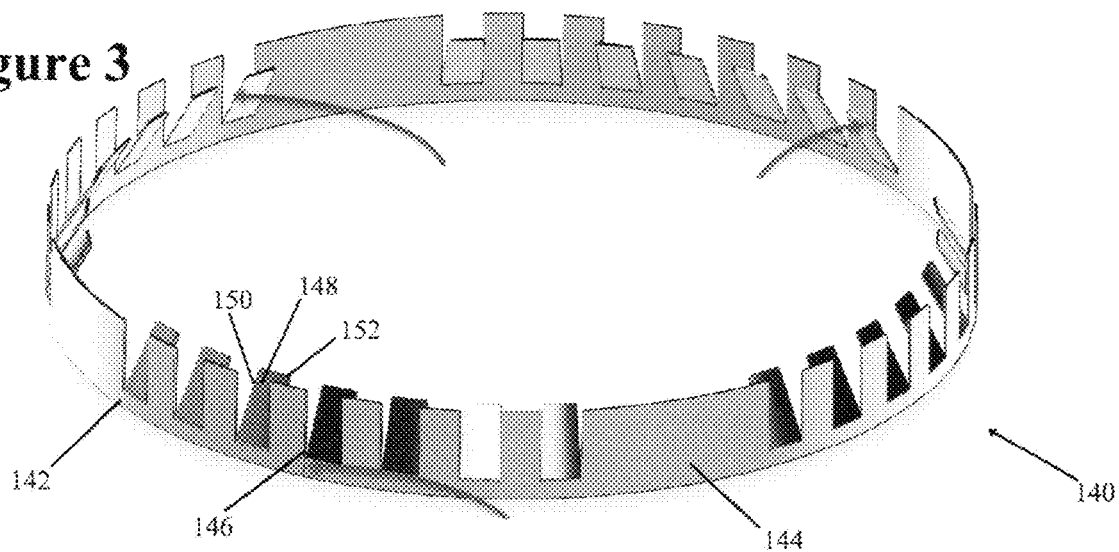
FIG. 3 is a perspective view of a grip ring included with the pipe coupling shown in FIG. 2.

As seen in FIG. 3, the grip ring 140 is formed with a grip ring sidewall 142 preferably formed with metal, and which includes alternating arrangement of four blank sections 144 and four gripping sections 146 integrally formed around the periphery of the sidewall 142. Each of the blank section 144 includes an arcuate blank sidewall sheet to form a structural part of the sidewall 142, and each of the gripping section 146 has multiple gripping teeth 148 extending generally inwardly towards a center of the grip ring 140. The gripping teeth 148 are preferably formed by first providing a blank ring structure, making incomplete longitudinal cuts from one longitudinal end of the blank ring structure in the gripping sections 146 to provide multiple tabs and inwardly bending every other one of the tabs to form the teeth 148 with a pair of opposed longitudinal edges 150 and a transverse edge 152. The two corners formed at the intersections of the longitudinal edges 150 and the transverse edge 152 are preferably rounded to reduce resistance against rotation of the plastic pipe when engaged thereto.

As seen in FIGS. 4 and 5, the retainer ring 160 is formed with a retainer ring sidewall 162 having retainer ring proximal and distal ends 164, 166, as well as a cover flange 163 coupled to the distal end 166 of the sidewall 162. A number of features are included on the opposed proximal end 164, in order to permit engagement with the grip ring 140 and the sleeve 40, as will be further described below. Specifically, as seen in FIG. 4, the proximal end 164 includes around the periphery thereof alternating arrangement of four slotted sections 168 and four cantilever sections 170. Each said slotted section 168 defines multiple open ended slots 171 sized to receive and abut against associated said gripping teeth 148, and each said cantilever section 170 includes a cantilever beam or arm 172 extending longitudinally along a length of the sidewall 162. The cantilever beam 172 extends longitudinally to an outwardly extending hook or protrusion 174 shape to be received in an associated one of the apertures 52, as will be further described below. A seen in FIG. 1, the cover flange 163 defines four notches 176 in longitudinal alignment with the beam 172 and the hook 174.

For installation, the gasket 80 is inserted with the proximal end 82 first through the first axial end 44 of the sleeve sidewall 42, until the lip 86 is received in the pocket 68 between the sidewall 42 and the ridge 66, and an outer surface of the gasket 80 is in fluid sealing contact with an inner surface of the sidewall 42 in the enlarged diameter portion 58.

The retainer ring 160 is the inserted through the grip ring 140, such that the alternating cantilever sections 170 of the former are radially aligned with the alternating blank sections 144 of the latter, and the alternating slotted sections 168 are radially aligned with the alternating gripping sections 146. The retainer ring 160 is further aligned with the grip ring 140, such that the gripping teeth 148 are received in associated said open ended slots 171 when, for example, the proximal end 164 of the retainer ring 160 is advanced through the grip ring 140 towards the teeth 148. It is to be noted that each said open ended slot 170 is defined in part with a beveled transverse edge surface (see FIGS. 2 and 4) oriented at an angle to permit the surface to be in abutting contact with the inwardly angled gripping teeth 148. Therefore, the grip ring 140 is positioned relative to the retainer ring 160 such that the gripping teeth 148 abut the beveled transverse edge surfaces. When positioned, the gripping teeth 148 are dimensioned and arranged such that the gripping teeth 148 traverse through and past the open ended slots 171, and the transverse edge 152 are disposed more inwardly past the inner diameter of the retainer ring 160.

For engagement of the rings 140, 160 as the pipe engagement assembly 100 to the sleeve 40, the rings 140, 160 thus positioned are inserted through the first axial end 42, such that the cantilever beams 172 and the hooks 174 are aligned with the apertures 54, and are advanced until the hooks 174 are received in the apertures 54 to establish snap fit engagement between the sleeve 40 and the assembly 100. In the snap fit engagement, the grip ring 140 is dimensioned to be received in the further enlarged diameter portion 60 preferably in contact with the second shoulder 64, where the thickness of the second shoulder 64 is substantially identical to the thickness of the grip ring 140. Furthermore, in the snap fit engagement, the retainer ring 160 is received in the enlarged diameter portion 58 with the proximal end 164 contacting or in close proximity to the gasket 80, and the cover flange 163 extending past the first axial end 44, where the retainer ring sidewall 162 has a thickness substantially identical to the thickness of the first shoulder 62.

With the pipe engagement assembly 100 in the snap fit engagement with the sleeve 40, the radius of the internal bore 48 proximal to the first axial end 44 is, in the order of proximity to the stop flange 50, defined by the reduced diameter portion 56, the gasket 80 and the retainer ring 160 received in the portions 58, 60, to effectively provide for a relatively constant radius from the stop flange 50 to the cover flange 163. Likewise, the gasket 180 and the pipe engagement assembly 200 are to be received in the second axial end 46 in the same manner as described in respect of the gasket 80 and the assembly 100 to again provide a relatively constant internal radius.

To fluidically couple two plastic pipes, an open end of one plastic pipe is inserted into the first axial end 44 until the open end abuts the stop flange 50 (see for illustration FIGS. 4 and 5). Once inserted, the annual seal 88 is deformably pressed against an outer surface of the pipe, thereby establishing a fluid sealing contact with the pipe. Furthermore, during the insertion process, the gripping teeth 148 are pressed outwardly against the resilient bias with the pipe travelling inwardly into the internal bore 48, and after the pipe is fully inserted and a pulling force is applied, the gripping teeth 148 presses or "bite" into a pipe outer surface to resist or prevent an outward movement of the pipe. Likewise, an open end of another plastic pipe is inserted into the second axial end 46 and contacts the stop flange 50, to establish a fluid sealing contact between the pipe coupling 10 and the pipe. With the two plastic pipes received in the pipe coupling 10, fluid connection between the pipes is established.

To uncouple the pipes, the hooks 174 are pressed inwardly through the apertures 52 (by, for example, pressing a screwdriver against the hooks 174) to release the hooks 174 from the apertures 52, and the pipe is pulled out from the sleeve 40, often together with the pipe engagement assembly 100. Once removed, the assembly 100 can be disengaged from the pipe 300, if needed, and the assembly 100 can be reused.

Figure 6:
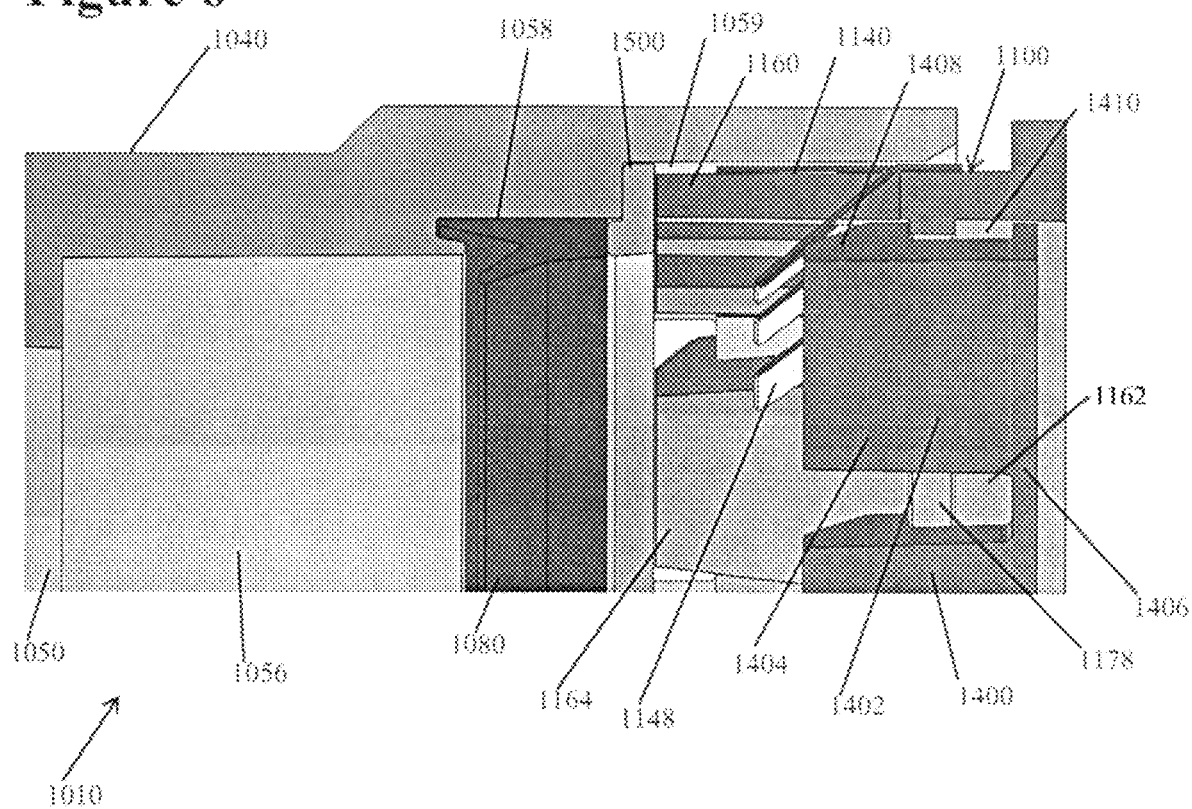
FIG. 6 is a partial lateral cross sectional view of a pipe coupling in accordance with another preferred embodiment of the present invention.

In another construction, the pipe coupling is further provided with an unlocking ring to effect removal or uncoupling of the pipe therefrom. As seen in FIG. 6, a pipe coupling 1010 differs from the pipe coupling 10 described above in reference to FIGS. 1 to 5, in that the former further includes an unlocking ring 1400, which will be further described below. For brevity and clarity, features and components of the pipe coupling 1010 different from the pipe coupling 10 will be described below in reference to FIGS. 6 to 14, and with reference numbers similar to those used with the pipe coupling 10.

Figure 7:
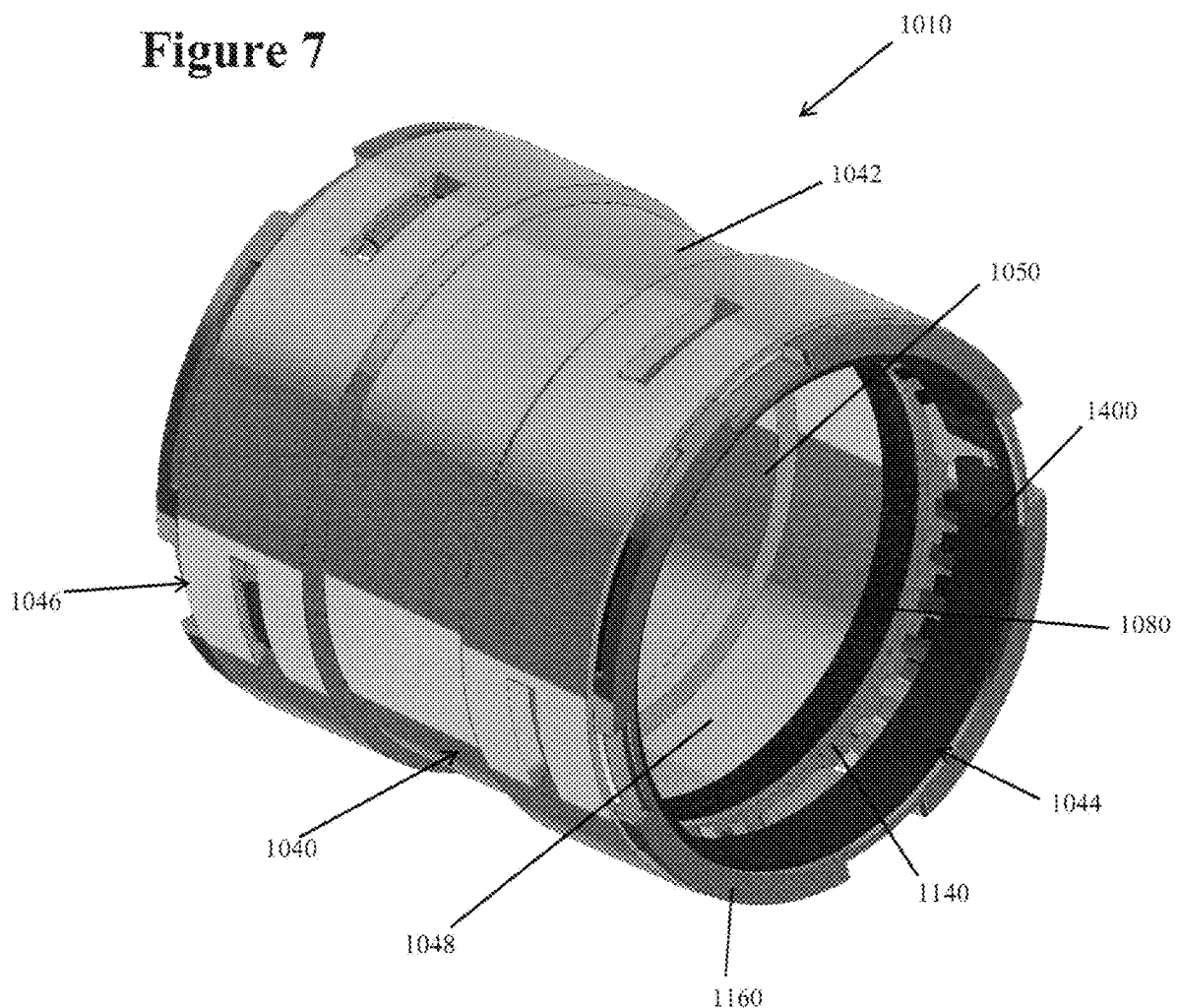
FIG. 7 is a perspective view of the pipe coupling shown in FIG. 6.

It is to be appreciated that unless specifically described below, features and components of the pipe coupling 1010 are identical or substantially identical to the corresponding features and components of the pipe coupling 10 as described above and illustrated in FIGS. 1 to 5. For instance, similar to the pipe coupling 10, and as seen in FIGS. 6 and 7, the pipe coupling 1010 is provided with an elongate body or sleeve 1040, an elastomeric gasket 1080 and a pipe engagement assembly 1100 having a grip ring 1140 and a retainer ring 1160. As described above in respect of the pipe coupling 10, the pipe coupling 1010 also includes a further elastomeric gasket and a further pipe engagement assembly that are identical respectively to the gasket 1080 and the assembly 1100.

As seen in FIG. 6, the pipe coupling 1010 differs in that the unlocking ring 1400 is further provided, and is received in the retainer ring 1160. The unlocking ring 1400 is formed with an unlocking ring sidewall 1402 having unlocking ring proximal and distal ends 1404, 1406, with the proximal end 1404 including a beveled disengagement portion 1408 shaped for disengaging the pipe from gripping teeth 1148 provided on the grip ring 1140, as will be further described below. The sidewall 1402 defines on an outer surface an outwardly open annular groove or channel 1410 between the proximal and distal ends 1404, 1406 for movable engagement between the retainer ring 1160 and the unlocking ring 1400, as will be further described below.

To permit movable engagement with the unlocking ring 1400, in addition to the features or components described above in respect of the retainer ring 160, the retainer ring 1160 includes a rib 1178 extending inwardly from an inner surface of a retainer ring sidewall 1162. The rib 1178 is sized to locate in the groove 1410 when the unlocking ring 1400 is disposed in the retainer ring 1160 in movable engagement therewith, as will be further described below. More specifically, the groove 1410 has a width greater than that of the rib 1178, so as to permit longitudinal movement of the rib 1178 therein, and therefore, relative longitudinal movement between the rings 1160, 1400.

Figure 8:
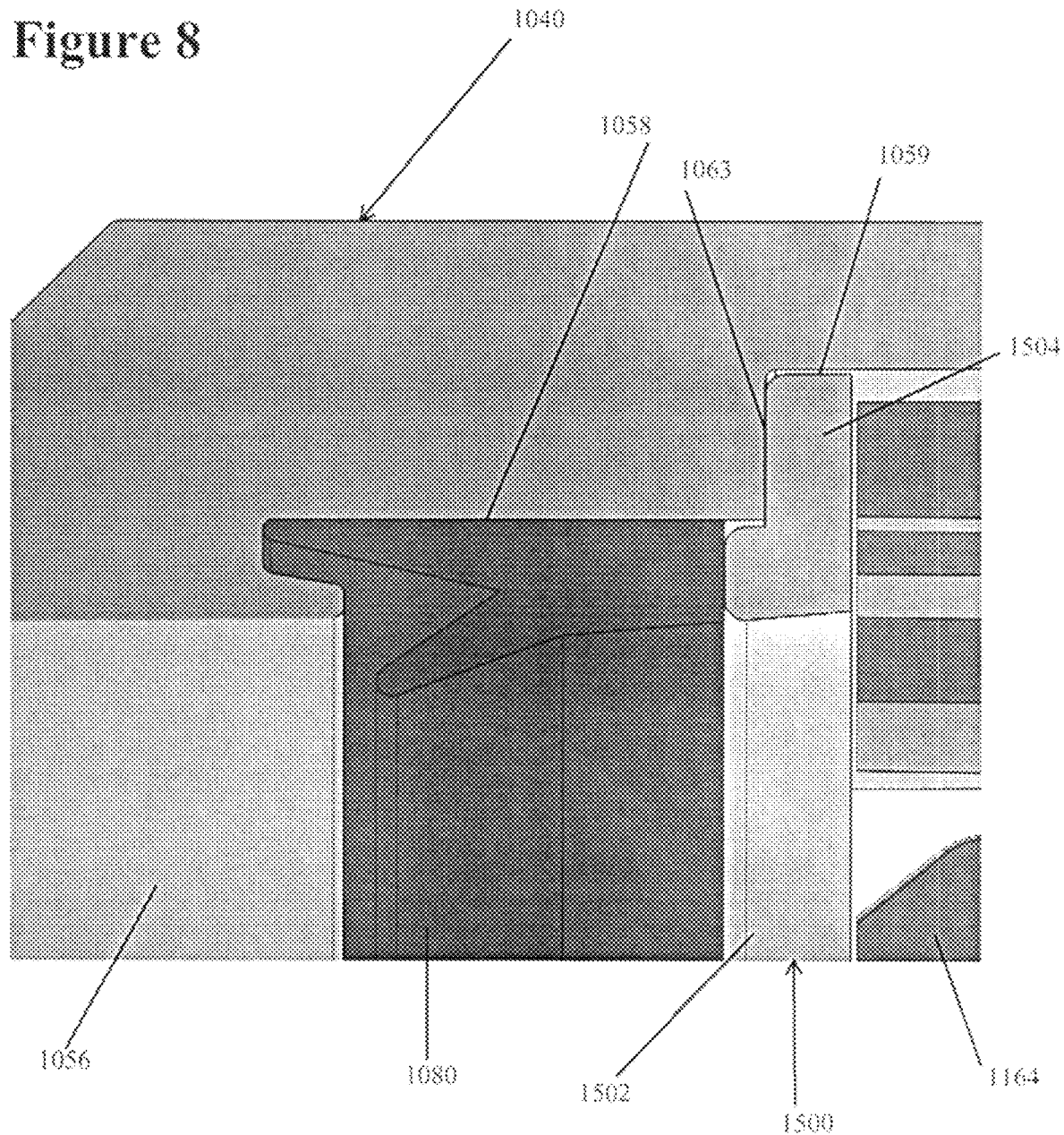
FIG. 8 is a magnified partial lateral cross sectional view of the pipe coupling shown in FIG. 6.
Figure 9:
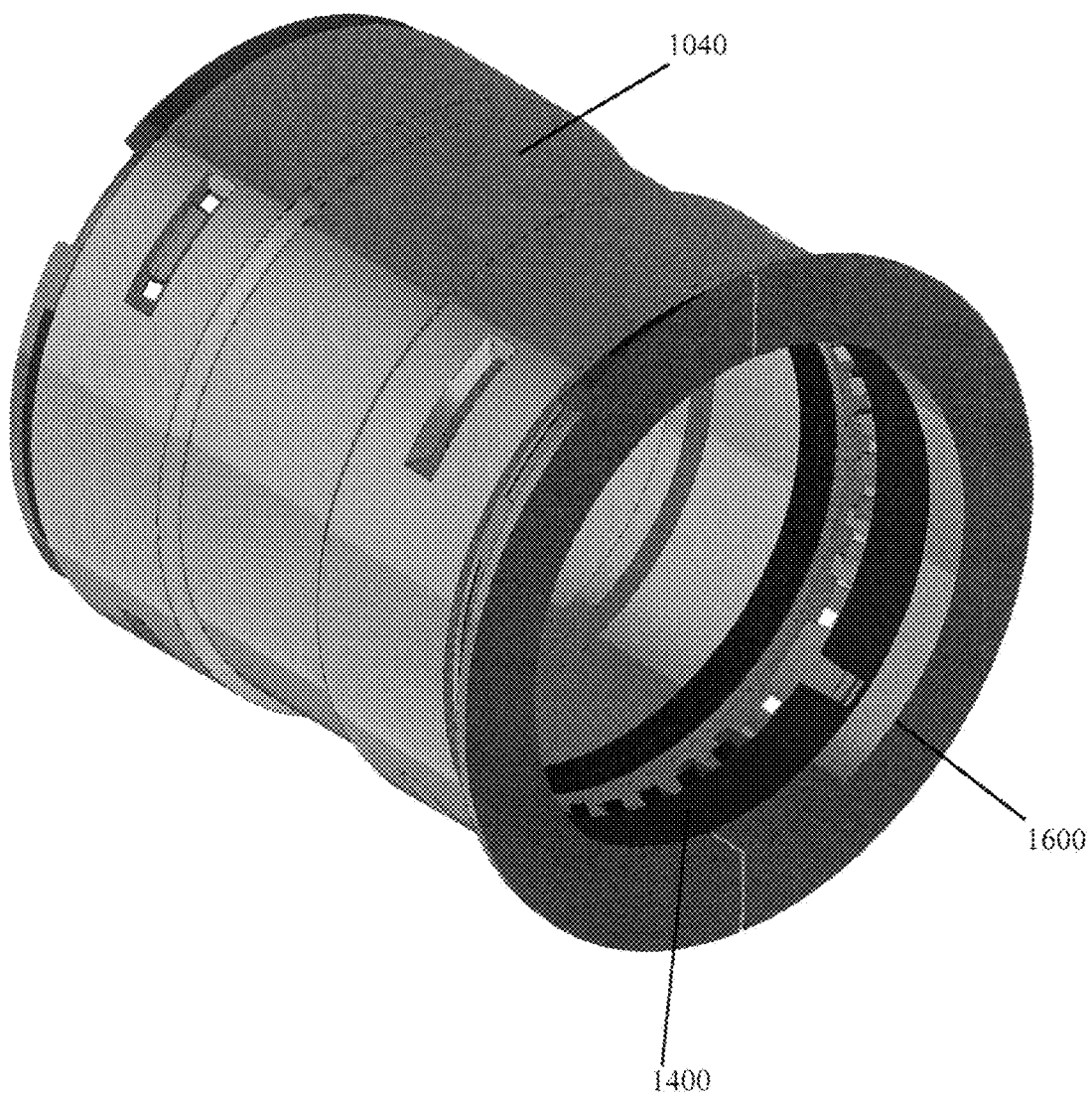
FIG. 9 is a perspective view of the pipe coupling shown in FIG. 6 in use with an unlocking ring tool.

As seen in FIG. 7, and not unlike the sleeve 40, the sleeve 1040 includes a sidewall 1042 having opposed first and second axial ends 1044, 1046 defining an internal bore 1048 therebetween, and the first axial end 1044 includes reduced and enlarged diameter portions 1056, 1058. Unlike the sleeve 40, the first axial end 1044 further includes a second enlarged diameter portion 1059 of a diameter larger than those of the portions 1056, 1058. The enlarged diameter portion 1058 is sized for receiving the elastomeric gasket 1080 (and not the retainer ring 1160), and the second enlarged diameter portion 1059 the retainer ring 1160 during installation, as will be further described below. The sleeve 1040 is illustrated in FIGS. 6 and 8 without a portion that directly corresponds to the further enlarged diameter portion 60 defined by the sleeve 40 for receiving the grip ring 140. Although not shown, the sleeve 1040 may or may not include the corresponding further enlarged diameter portion, and if not included, the grip ring 1140 is received in the second enlarged diameter portion 1059 with the retainer ring 1160, as will be further discussed below.

For installation, the gasket 1080 is inserted into the sleeve 1040 to be received in the enlarged diameter portion 1056 in a manner similar to that described above in respect of the gasket 80. Unlike the pipe coupling 10, the pipe coupling 1010 is further provided with a retention member 1500 having a retention ring 1502 and a retention flange 1504 extending outwardly from the ring 1502, as seen in FIG. 8. To securely retain the gasket 1080 in the reduced diameter portion 1056, the retention member 1500 is inserted into sleeve 1040, such that the retention ring 1502 contacts the gasket 1080 and the retention flange 1504 is received in the enlarged diameter portion 1058 in abutting contact with an intermediate shoulder 1063 located between the portions 1056, 1058.

The retainer ring 1160 is then inserted through the grip ring 1140, and the rings 1140, 1160 are inserted through the first axial end 1042 to establish snap fit engagement between the sleeve 1040 and the pipe engagement assembly 1100, in a manner similar to that described in respect of the rings 140, 160. Furthermore, the unlocking ring 1400 is inserted through the retainer ring 1160, whereby the rib 1178 of the latter is received in the groove 1410 defined by the former. In the snap fit engagement, the rings 1140, 1160 are received in the second enlarged diameter portion 1060, and a proximal end 1164 of the retainer ring 1160 contacts the retention flange 1504, such that the retention flange 1504 is disposed between the proximal end 1164 and the intermediate shoulder 1063 in abutting engagement therewith. Therefore, in the snap fit engagement, the retention member 1500 is securely retained in the sleeve 1040, thereby also securely retaining the gasket 1080 therein.

In contrast to the pipe fitting 10, with the pipe engagement assembly 1100 in the snap fit engagement with the sleeve 1040, the radius of the internal bore 1048 proximal to the first axial end 1044 is, in the order of proximity to a stop flange 1050, defined at least partially by the reduced diameter portion 1056, the gasket 1080 and the unlocking ring 1400, to effectively provide for a relatively constant radius from the stop flange 1050 outwardly in the first axial end 1044.

Figure 12:
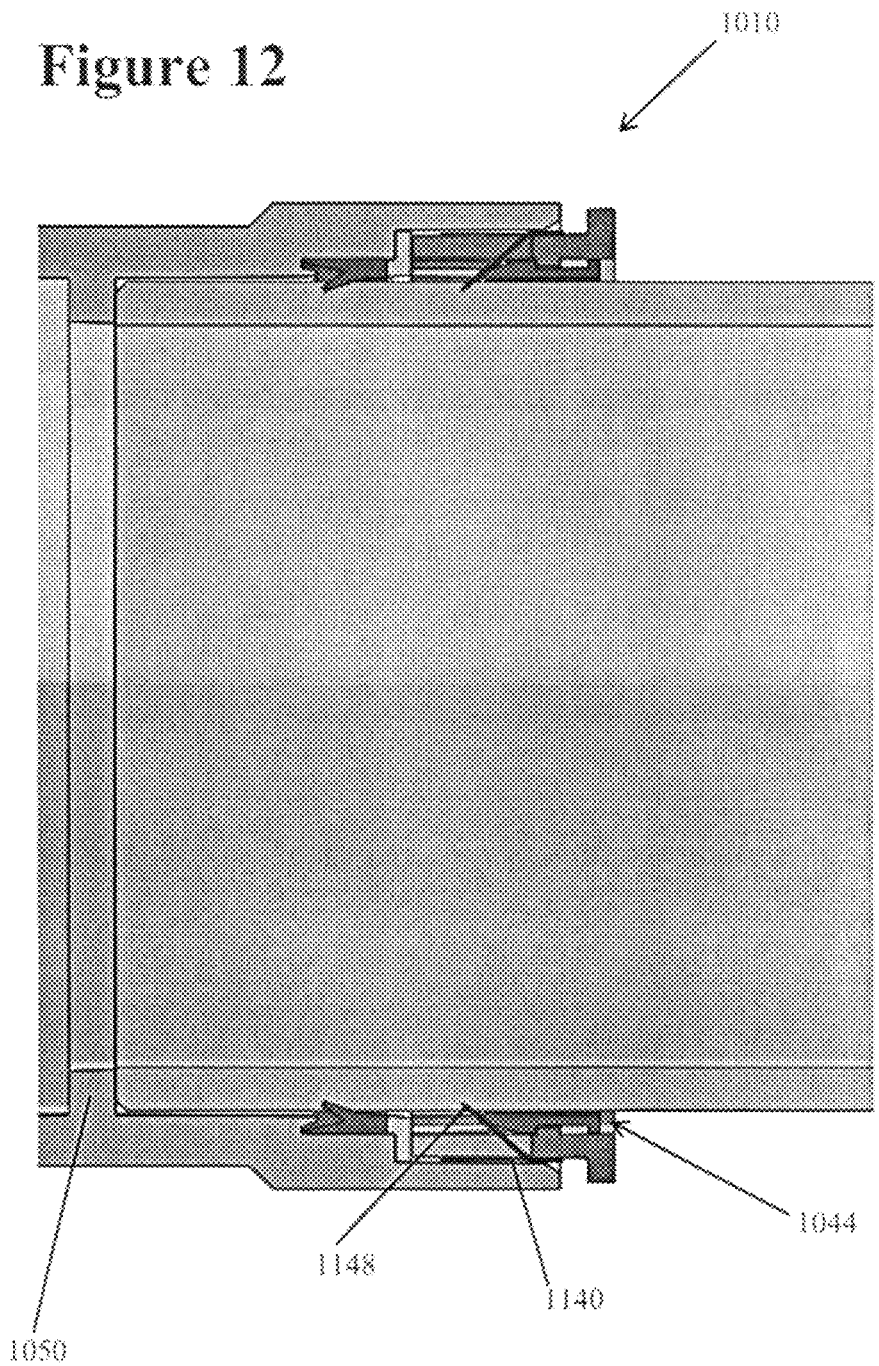
FIG. 12 is a partial lateral cross sectional view of the pipe coupling shown in FIG. 6 in operation with a pipe.

Similar to the pipe fitting 10 described above, to fluidically couple two plastic pipes, an open end of one plastic pipe is inserted into the first axial end 1044 until the open end abuts the stop flange 1050, as seen in FIG. 12, the gasket 1080 is in a fluid sealing contact with the pipe, and gripping teeth 1148 of the grip ring 1140 presses or "bite" into a pipe outer surface to resist or prevent an outward movement of the pipe. Likewise, an open end of another plastic pipe is inserted into the second axial end 1046 and contacts the stop flange 1050, to establish a fluid sealing contact between the pipe coupling 1010 and the pipe. With the two plastic pipes received in the pipe coupling 1010, fluid connection between the pipes is established.

Figure 10:
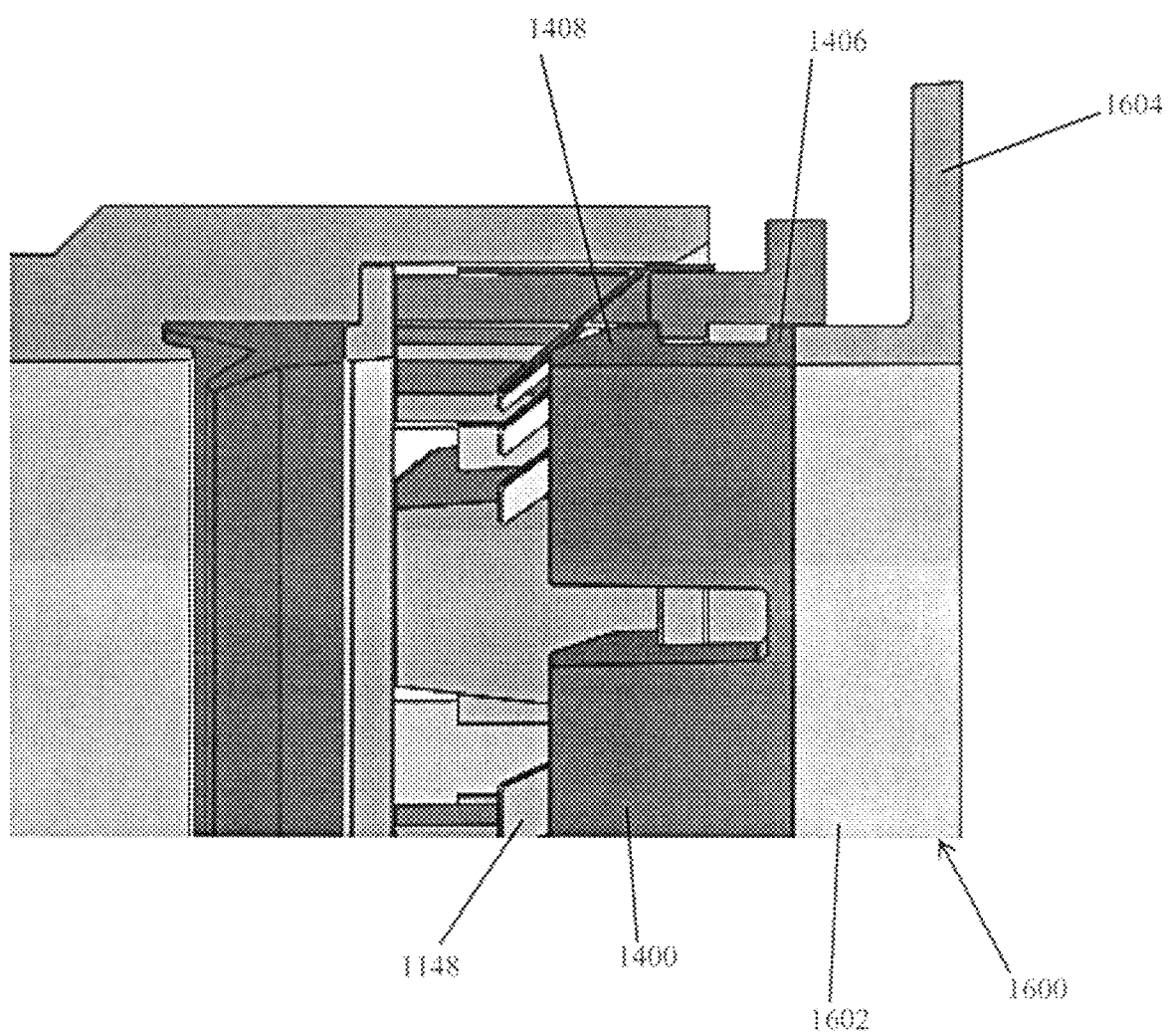
FIG. 10 is a partial lateral cross sectional view of the pipe coupling and the unlocking ring tool shown in FIG. 9.
Figure 11:
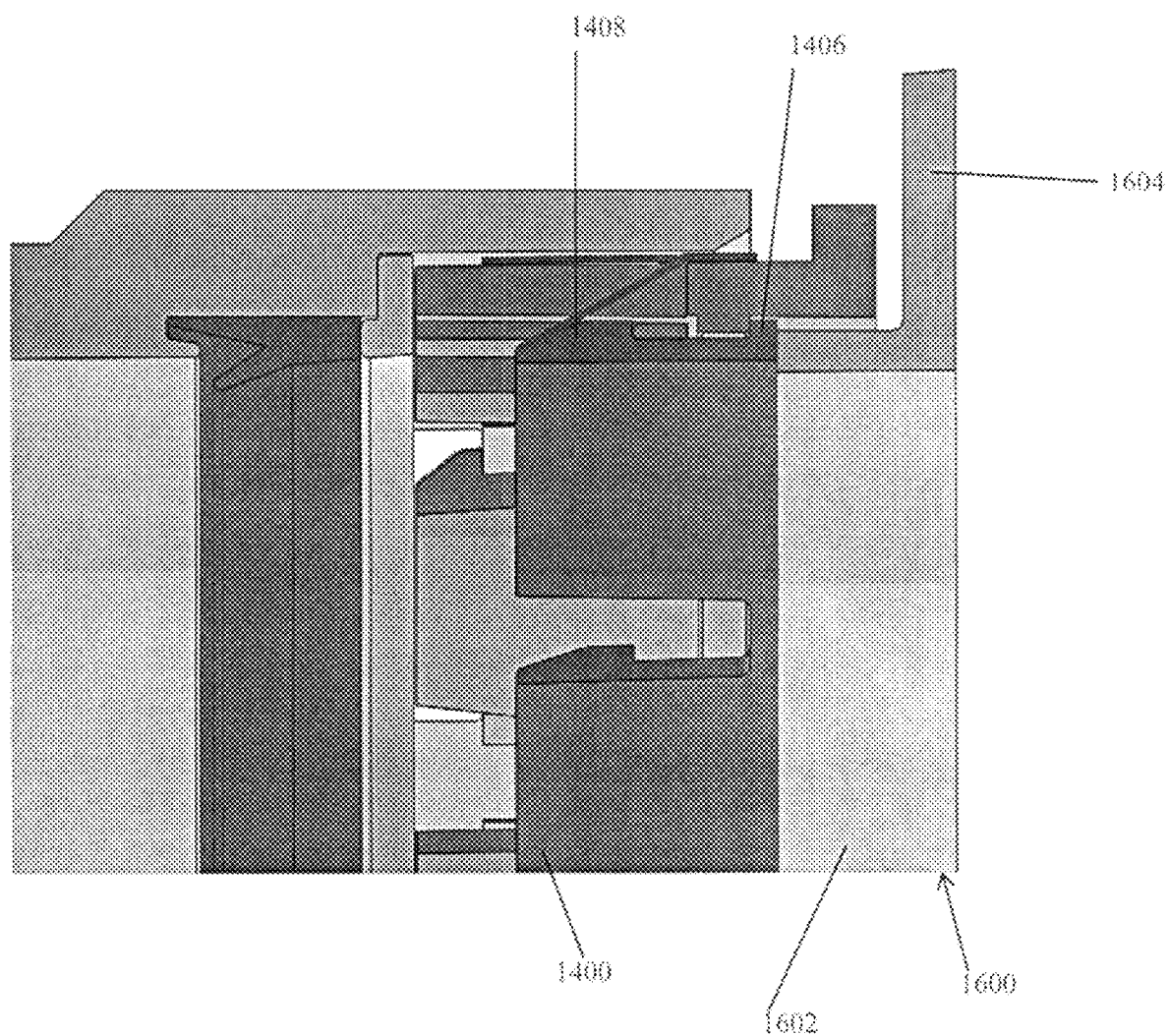
FIG. 11 is a partial lateral cross sectional view of the pipe coupling and the unlocking ring tool shown in FIG. 9, with the unlocking ring tool moved towards an unlocking position.

To uncouple the pipes, the pipe fitting 1010 provides two different mechanisms, with the first being similar to that described in respect of the pipe fitting, where the hooks (corresponding to the hooks 174) provided with the retainer ring 1160 are pressed inwardly through apertures (corresponding to the apertures 52) defined by the sleeve 1040 to be released therefrom, and the pipe is pulled out from the sleeve 1040. As seen in FIGS. 10 and 11, a second mechanism involves longitudinal movement of the unlocking ring 1400 towards the gripping teeth 1148 to thereby wedge the beveled disengagement portion 1408 between the pipe and the gripping teeth 1148, urging the latter outwardly to disengage from the pipe.

To effect the movement of the unlocking ring 1400, in one embodiment illustrated in FIGS. 6, 7 and 9 to 12, the pipe fitting 1010 is further provided with an unlocking ring tool 1600 having a cylindrical portion 1602 sized to be inserted between the retainer ring 1160 and the pipe, and contact the distal end 1406 for transmission of a longitudinal force thereto. The unlocking ring tool 1600 further comprises a handle flange 1604 extending radially outwardly from one axial end of the cylindrical portion 1602. The tool 1600 is dimensioned to permit a user to hold the handle flange 1604 and insert the cylindrical portion 1602 between the retainer ring 1160 and the pipe and apply the longitudinal force to be transmitted to the unlocking ring 1400.

Figure 13:
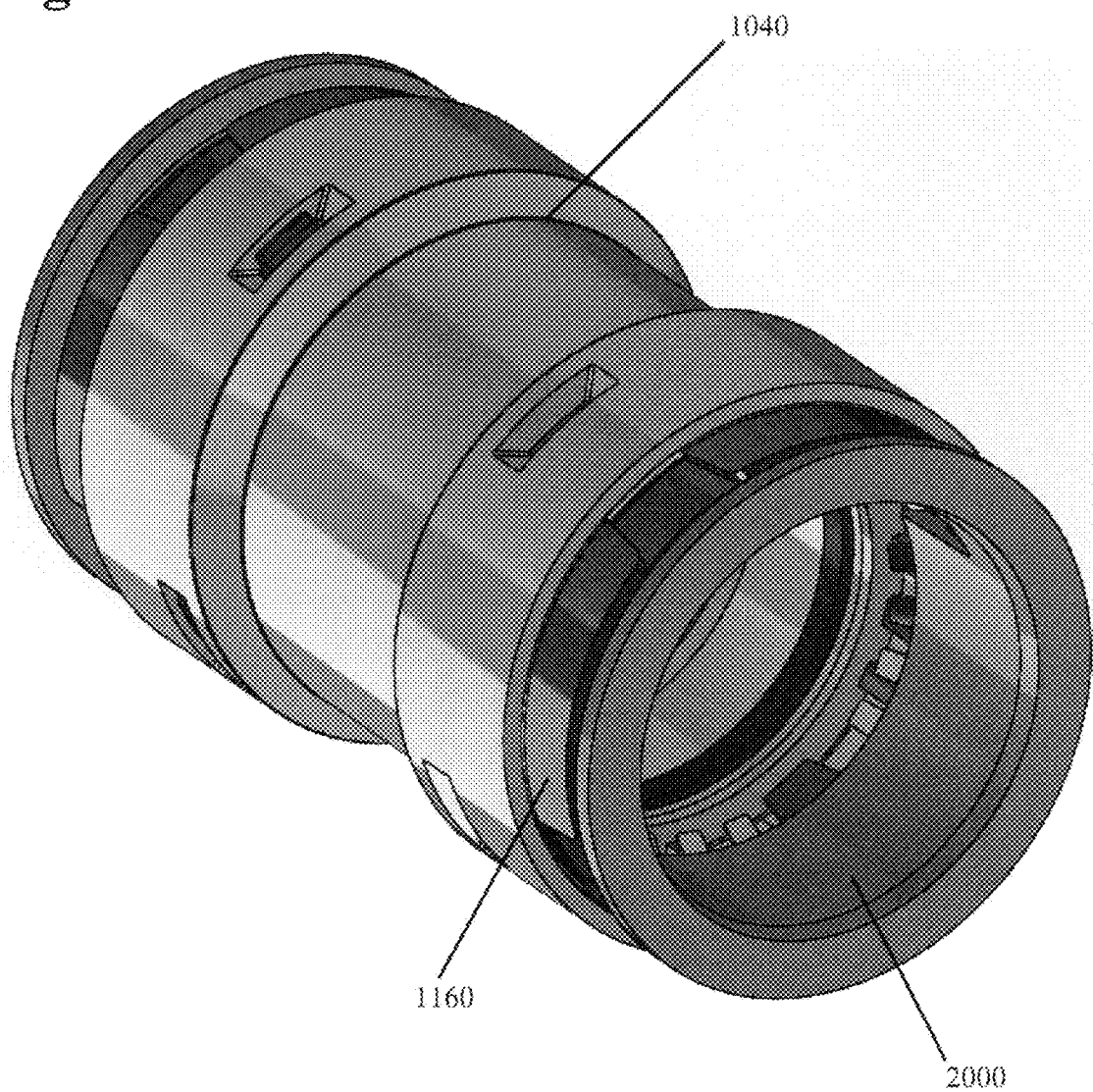
FIG. 13 is a partial lateral cross sectional view of an alternative version of the pipe coupling shown in FIG. 6.
Figure 14:
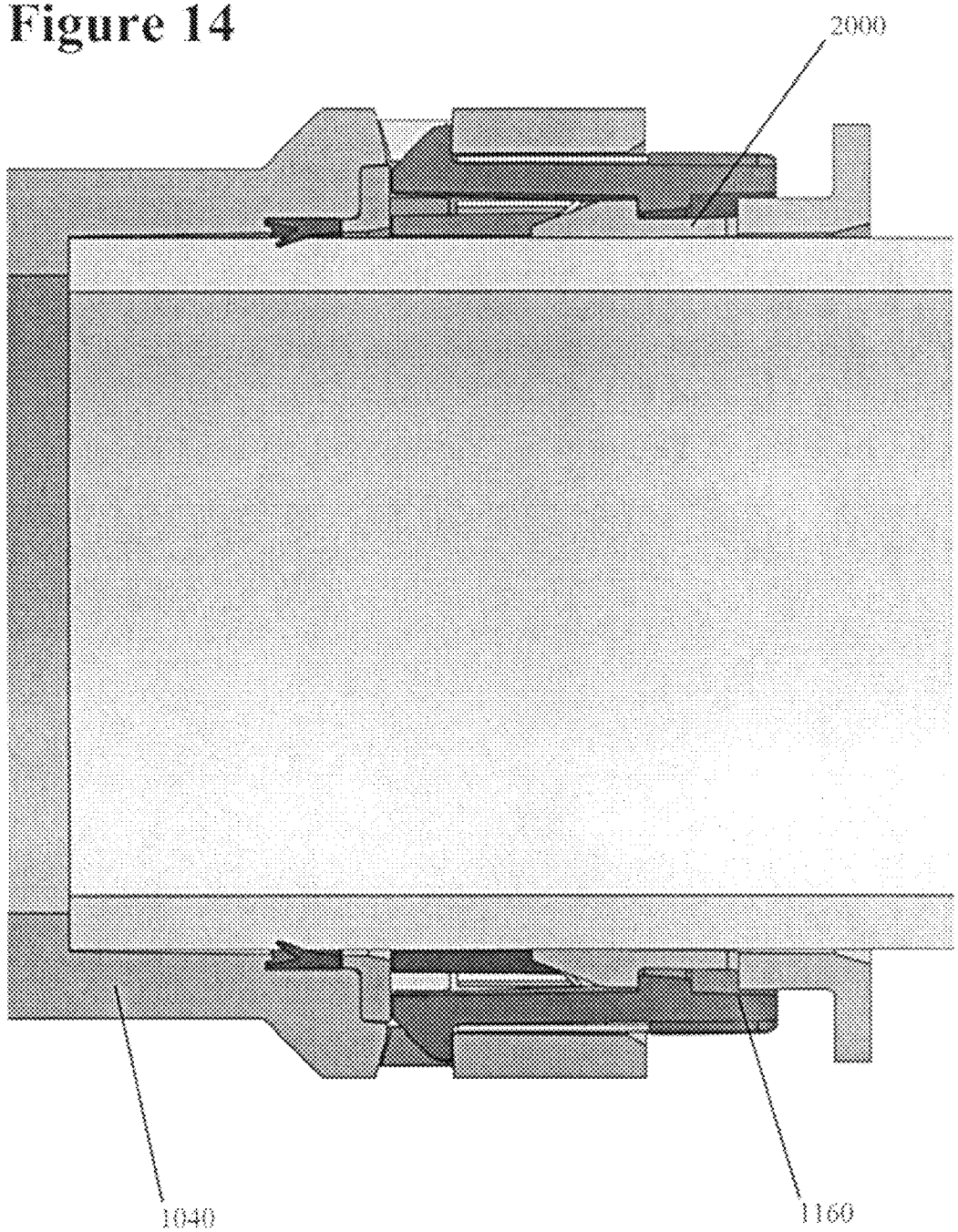
FIG. 14 is a partial lateral cross sectional view of the pipe coupling shown in FIG. 13.

In an alternative embodiment illustrated in FIGS. 13 and 14, the unlocking ring and the unlocking ring tool are combined in a single piece construction 2000 with the handle flange extending past the retainer ring 1160.

While the invention has been described with reference to preferred embodiments, the invention is not or intended by the applicant to be so limited. A person skilled in the art would readily recognize and incorporate various modifications, additional elements and/or different combinations of the described components consistent with the scope of the invention as described herein.

We claim:

1. A pipe fitting comprising a coupling body having two or more open ends and a pipe engagement assembly for attachment to the open end for engagement of a pipe thereto, the pipe engagement assembly comprising a retainer ring and a grip ring, and the coupling body comprising a sidewall defining an internal bore sized for receiving at least a portion of the pipe and the retainer ring, the retainer ring being dimensioned to be received at least partially by the grip ring and to receive the pipe therethrough, wherein the grip ring comprises a plurality of first projections extending inwardly towards the bore to engage the pipe, and the retainer ring comprises one or more second projections extending outwardly to releasably engage the sidewall, the retainer ring defining a plurality of slots sized to receive the first projections therethrough, wherein the slots are positioned to retain the first projections with the grip ring engaging the pipe and the second projections engaging the sidewall, thereby retaining the grip ring and the pipe to the open end, wherein the coupling body further comprises a stop flange extending inwardly from the sidewall for abutting contact with a longitudinal end of the pipe, and the internal bore comprises an enlarged diameter portion and a reduced diameter portion interposed between the enlarged diameter portion and the stop flange, wherein the enlarged diameter portion is sized for receiving the retainer ring, and the reduced diameter portion is sized for receiving the longitudinal end of the pipe, wherein the internal bore further comprises a further enlarged diameter portion interposed between the enlarged diameter portion and the open end, the further enlarged diameter portion being sized to at least partially receive the grip ring, and the first projections comprise gripping teeth angled inwardly towards the stop flange to resist movement of the pipe away from the stop flange, wherein the retainer ring comprises a retainer ring sidewall having first and second axial ends, the first axial end being for placement proximate to the stop flange relative to the second axial end, and the slots are open ended slots defined along a periphery of the first axial end to receive the gripping teeth therein with the grip ring received in the further enlarged diameter portion and the first axial end inserted into the enlarged diameter portion, and wherein the sidewall defines one or more apertures located for receiving the one or more second projections, each said second projection comprising a cantilever arm extending along a longitudinal axis of the retainer ring from the first axial end to an outwardly extending protrusion for snap fit engagement in an associated one of the apertures.

2. The pipe fitting of claim 1, wherein the pipe engagement assembly further comprises a resiliently deformable gasket shaped to be received in the enlarged diameter portion adjacent to the reduced diameter portion in fluid sealing contact with the pipe, and wherein the retainer ring is dimensioned for preventing movement of the gasket towards the open end when the pipe is received through the gasket and the retainer ring.

3. The pipe fitting of claim 1, wherein the open ended slots are profiled for complementary abutting contact with an angled surface of the gripping teeth, whereby the retainer ring resists movement of the grip ring away from the coupling body with the second projections engaging the sidewall and when a pulling force is applied to the pipe in engagement with the grip ring.

4. The pipe fitting of claim 1, wherein the retainer ring comprises two or more said cantilever arms spaced around the periphery of the first axial end and the open ended slots are interposed between the cantilever arms, wherein the cantilever arm is sized to locate the protrusion past the grip ring towards the stop flange.

5. The pipe fitting of claim 1, wherein each said aperture traverses through a thickness of the sidewall, thereby permitting removal of the protrusion from the aperture by application of an inward force against the protrusion through the aperture, and the second axial end comprises a cover flange extending outwardly past the grip ring.

6. A pipe fitting comprising an elongate coupling body having opposed open ends and a pipe engagement assembly for attachment to the open end for engagement of a pipe thereto, the pipe engagement assembly comprising a retainer ring and a grip ring, and the coupling body comprising a sidewall defining an internal bore sized for receiving at least a portion of the pipe and the retainer ring, the retainer ring being dimensioned to be received at least partially by the grip ring and to receive the pipe therethrough, wherein the coupling body further comprises a stop flange extending inwardly from the sidewall for abutting contact with a longitudinal end of the pipe, and wherein the grip ring comprises a first projection extending inwardly towards the bore to engage the pipe, and the retainer ring comprises a second projection extending outwardly to releasably engage the sidewall, the retainer ring further comprising a retainer ring sidewall having first and second axial ends, the first axial end being shaped for abutting contact with the first projection proximate to the stop flange relative to the second axial end, wherein the first axial end is positioned to retain the first projection with the grip ring engaging the pipe and the second projection engaging the sidewall, thereby retaining the grip ring and the pipe to the open end, wherein the internal bore further comprises a further enlarged diameter portion interposed between the enlarged diameter portion and the open end, the further enlarged diameter portion being sized to at least partially receive the grip ring, and the first projection comprises a plurality of gripping teeth angled inwardly towards the stop flange to resist movement of the pipe away from the stop flange, wherein the first axial end comprises a beveled or chamfered rim profiled for complementary abutting contact with an angled surface of the gripping teeth, whereby the retainer ring resists movement of the grip ring away from the coupling body with the second projection engaging the sidewall and when a pulling force is applied to the pipe in engagement with the grip ring, and wherein the retainer ring further comprises a plurality of spaced apart posts extending along a longitudinal axis of the retainer ring from the rim to define a plurality of open ended slots sized to receive the gripping teeth therein with the grip ring received in the further enlarged diameter portion and the first axial end inserted into the enlarged diameter portion.

7. The pipe fitting of claim 6, wherein the internal bore comprises an enlarged diameter portion and a reduced diameter portion interposed between the enlarged diameter portion and the stop flange, wherein the enlarged diameter portion is sized for receiving the retainer ring, and the reduced diameter portion is sized for receiving the longitudinal end of the pipe.

8. The pipe fitting of claim 7, wherein the pipe engagement assembly further comprises a resiliently deformable gasket shaped to be received in the enlarged diameter portion adjacent to the reduced diameter portion in fluid sealing contact with the pipe, and wherein the retainer ring is dimensioned for preventing movement of the gasket towards the open end when the pipe is received through the gasket and the retainer ring.

9. The pipe fitting of claim 6, wherein the sidewall defines an aperture located for receiving the second projection, the second projection comprising a cantilever arm extending along the longitudinal axis of the retainer ring from the first axial end to an outwardly extending protrusion for snap fit engagement in the aperture.

10. The pipe fitting of claim 9, wherein the retainer ring comprises two or more said cantilever arms spaced around a periphery of the first axial end and the open ended slots are interposed between the cantilever arms, wherein the cantilever is sized to locate the protrusion past the grip ring towards the stop flange.

11. The pipe fitting of claim 9, wherein the aperture traverses through a thickness of the sidewall, thereby permitting removal of the protrusion from the aperture by application of an inward force against the protrusion through the aperture, and the second axial end comprises a cover flange extending outwardly past the grip ring.

12. The pipe fitting of claim 6, wherein the pipe fitting comprises two said pipe engagement assemblies for attachment to the respective opposed open ends for engagement of two said pipes thereto, thereby fluidically coupling said two pipes.

13. A pipe fitting assembly comprising a pipe and a pipe fitting, the pipe fitting comprising an elongate coupling body having opposed open ends and a pipe engagement assembly for attachment to the open end for engagement of a pipe thereto, the pipe engagement assembly comprising a retainer ring and a grip ring, and the coupling body comprising a sidewall defining an internal bore sized for receiving at least a portion of the pipe and the retainer ring, the retainer ring being dimensioned to be received at least partially by the grip ring and to receive the pipe therethrough, wherein the coupling body further comprises a stop flange extending inwardly from the sidewall for abutting contact with a longitudinal end of the pipe, wherein the grip ring comprises a plurality of first projections extending inwardly towards the bore to engage the pipe, and the retainer ring comprises one or more second projections extending outwardly to releasably engage the sidewall, the retainer ring defining a plurality of slots sized to receive the first projections therethrough, wherein the slots are positioned to retain the first projections with the grip ring engaging the pipe and the second projections engaging the sidewall, thereby retaining the grip ring and the pipe to the open end, and wherein the sidewall defines one or more apertures located for receiving the one or more second projections, each said second projection comprising a cantilever arm extending along a longitudinal axis of the retainer ring to an outwardly extending protrusion for snap fit engagement in an associated one of the apertures.

14. The pipe fitting assembly of claim 13, wherein the internal bore comprises an enlarged diameter portion and a reduced diameter portion interposed between the enlarged diameter portion and the stop flange, wherein the enlarged diameter portion is sized for receiving the retainer ring, and the reduced diameter portion is sized for receiving the longitudinal end of the pipe.

15. The pipe fitting assembly of claim 14, wherein the pipe engagement assembly further comprises a resiliently deformable gasket shaped to be received in the enlarged diameter portion adjacent to the reduced diameter portion in fluid sealing contact with the pipe, and wherein the retainer ring is dimensioned for preventing movement of the gasket towards the open end when the pipe is received through the gasket and the retainer ring.

16. The pipe fitting assembly of claim 14, wherein the internal bore further comprises a further enlarged diameter portion interposed between the enlarged diameter portion and the open end, the further enlarged diameter portion being sized to at least partially receive the grip ring, and the first projections comprise gripping teeth angled inwardly towards the stop flange to resist movement of the pipe away from the stop flange.

17. The pipe fitting assembly of claim 16, wherein the retainer ring comprises a retainer ring sidewall having first and second axial ends, the first axial end being for placement proximate to the stop flange relative to the second axial end, and the slots are open ended slots defined along a periphery of the first axial end to receive the gripping teeth therein with the grip ring received in the further enlarged diameter portion and the first axial end inserted into the enlarged diameter portion.

18. The pipe fitting assembly of claim 17, wherein the open ended slots are profiled for complementary abutting contact with an angled surface of the gripping teeth, whereby the retainer ring resists movement of the grip ring away from the coupling body with the protrusion in snap fit engagement in the aperture and when a pulling force is applied to the pipe in engagement with the grip ring.

19. The pipe fitting assembly of claim 17, wherein the retainer ring comprises two or more said cantilever arms spaced around the periphery of the first axial end and the open ended slots are interposed between the cantilever arms, wherein the cantilever arm is sized to locate the protrusion past the grip ring towards the stop flange.

20. The pipe fitting assembly of claim 13, wherein each said aperture traverses through a thickness of the sidewall, thereby permitting removal of the protrusion from the aperture by application of an inward force against the protrusion through the aperture.

21. A pipe fitting comprising a coupling body having two or more open ends and a pipe engagement assembly for attachment to the open end for engagement of a pipe thereto, the pipe engagement assembly comprising a retainer ring, an unlocking ring and a grip ring, and the coupling body comprising a sidewall defining an internal bore sized for receiving at least a portion of the pipe and the retainer ring, the retainer ring being dimensioned to be received at least partially by the grip ring and to receive the pipe therethrough, wherein the grip ring comprises a plurality of first projections extending inwardly towards the bore to engage the pipe, and the retainer ring comprises one or more second projections extending outwardly to releasably engage the sidewall, the retainer ring defining a plurality of slots sized to receive the first projections therethrough, wherein the slots are positioned to retain the first projections with the grip ring engaging the pipe and the second projections engaging the sidewall, thereby retaining the grip ring and the pipe to the open end, and wherein the unlocking ring is dimensioned to be received at least partially by the retainer ring, the unlocking ring comprising a disengagement portion shaped for disengaging the first projections from the pipe.

22. The pipe fitting of claim 21, wherein the coupling body further comprises a stop flange extending inwardly from the sidewall for abutting contact with a longitudinal end of the pipe, and the internal bore comprises an enlarged diameter portion and a reduced diameter portion interposed between the enlarged diameter portion and the stop flange, wherein the enlarged diameter portion is sized for receiving at least the retainer ring, and the reduced diameter portion is sized for receiving the longitudinal end of the pipe.

23. The pipe fitting of claim 22, wherein the internal bore further comprises a gasket receiving portion interposed between the enlarged and reduced diameter portions, and the pipe engagement assembly further comprises a resiliently deformable gasket shaped to be received in the gasket receiving portion adjacent to the reduced diameter portion in fluid sealing contact with the pipe.

24. The pipe fitting of claim 22, wherein the first projections comprise gripping teeth angled inwardly towards the stop flange to resist movement of the pipe away from the stop flange, and wherein the retainer ring comprises a retainer ring sidewall having first and second axial ends, the first axial end being for placement proximate to the stop flange relative to the second axial end, and the slots are open ended slots defined along a periphery of the first axial end to receive the gripping teeth therein with the grip ring and the first axial end inserted into the enlarged diameter portion.

25. The pipe fitting of claim 24, wherein the open ended slots are profiled for complementary abutting contact with an angled surface of the gripping teeth, whereby the retainer ring resists movement of the grip ring away from the coupling body with the second projections engaging the sidewall and when a pulling force is applied to the pipe in engagement with the grip ring.

26. The pipe fitting of claim 24, wherein the sidewall defines one or more apertures located for receiving the one or more second projections, each said second projection comprising a cantilever arm extending along a longitudinal axis of the retainer ring from the first axial end to an outwardly extending protrusion for snap fit engagement in an associated one of the apertures.

27. The pipe fitting of claim 26, wherein the retainer ring comprises two or more said cantilever arms spaced around the periphery of the first axial end and the open ended slots are interposed between the cantilever arms, wherein the cantilever arm is sized to locate the protrusion past the grip ring towards the stop flange.

28. The pipe fitting of claim 26, wherein each said aperture traverses through a thickness of the sidewall, thereby permitting removal of the protrusion from the aperture by application of an inward force against the protrusion through the aperture.

29. The pipe fitting of claim 21, wherein the unlocking ring is movable towards an unlocking position, whereby the disengagement portion urges the first projections outwardly to disengage from the pipe.

30. The pipe fitting of claim 29, wherein the unlocking ring comprises an unlocking ring sidewall having first and second longitudinal ends, the first longitudinal end being for placement proximate to the first projections relative to the second longitudinal end, wherein the first longitudinal end comprises the disengagement portion beveled towards the first projections.

31. The pipe fitting of claim 30, wherein the unlocking ring sidewall comprises inner and outer surfaces, the outer surface defining an outwardly open groove interposed between the first and second longitudinal ends, and the retainer ring comprises an inwardly extending collar positioned to be received in the groove, whereby the unlocking ring and the retainer ring are movably coupled relative to each other, and wherein the inner surface is dimensioned for abutting engagement with the pipe.

32. The pipe fitting of claim 30, wherein unlocking ring sidewall is sized to locate the second longitudinal end past the retainer ring, the second longitudinal end comprising a handle flange for applying a longitudinal force to move the unlocking ring towards the unlocking position.

33. The pipe fitting of claim 30, wherein the unlocking ring sidewall is sized to locate the second longitudinal end in the retainer ring, the second longitudinal end comprising a contact surface for use with an unlocking ring tool shaped for longitudinal insertion between the retainer ring and the pipe and transmit a longitudinal force to the contact surface to thereby move the unlocking ring towards the unlocking position.

* * * * *